United States Patent [19]

Bliss et al.

[11] Patent Number: 4,633,411
[45] Date of Patent: Dec. 30, 1986

[54] LINK QUALITY ANALYZER

[75] Inventor: David H. Bliss, Cedar Rapids; Joseph C. Whited, Marion, both of Iowa

[73] Assignee: Rockwell International Corporation, El Segundo, Calif.

[21] Appl. No.: 453,656

[22] Filed: Dec. 27, 1982

[51] Int. Cl.[4] .................. H04B 3/46; H04B 17/00; G06F 15/332

[52] U.S. Cl. ............................ 364/481; 371/22; 364/514; 364/576

[58] Field of Search .............. 371/5, 22; 455/5, 62, 455/49

[56] References Cited

U.S. PATENT DOCUMENTS

| | | | |
|---|---|---|---|
| 3,626,168 | 12/1971 | Norsworthy | 364/481 |
| 3,842,247 | 10/1974 | Anderson | 364/481 |
| 3,876,946 | 4/1975 | La Clair et al. | 364/576 |
| 4,001,559 | 1/1977 | Osborne et al. | 364/481 |
| 4,074,201 | 2/1978 | Lennon | 364/481 |
| 4,124,818 | 11/1978 | Lin et al. | 364/481 |
| 4,199,809 | 4/1980 | Pasahow et al. | 364/200 |
| 4,301,536 | 11/1981 | Favin et al. | 364/481 |
| 4,309,773 | 1/1982 | Johnson et al. | 455/62 |
| 4,328,581 | 5/1982 | Harmon et al. | 371/5 |
| 4,381,546 | 4/1983 | Armstrong | 364/514 |
| 4,417,337 | 11/1983 | Favin et al. | 364/481 |

Primary Examiner—Felix D. Gruber
Attorney, Agent, or Firm—George A. Montanye; M. Lee Murrah; H. Fredrick Hamann

[57] ABSTRACT

A link quality analyzer measures the link quality between a calling station and a called station by continuously transmitting a plurality of signal tones. The called station receives the plurality of transmitting tones and sample them. A power spectrum is obtained of the received tones. From the statistics of the power spectrum the parameters of signal-to-noise ratio, multipath delay spread, Doppler frequency spread, frequency offset statistics, frequency-amplitude correlation, average amplitude response versus frequency, signal fading statistics, harmonic and intermodulation distortions, RMS-to-mean signal ratio, noise profile, and various noise statistics are determined. The power spectrum of the plurality of tones is measured through the use of digital sampling techniques and digital fast Fourier transform techniques that are implemented through microprocessor-level technology.

21 Claims, 21 Drawing Figures

30 — PROGRAM LQA86

PERFORMS LINK QUALITY ANALYSIS ON K-TONE DATA SAMPLED AND ANALYZED IN REAL TIME. THE PARAMETERS CALCULATED ARE SNR, MULTIPATH DELAY SPREAD (2-TONE), MULTIPATH DELAY SPREAD (3-TONE), DOPPLER FREQUENCY SPREAD, FREQUENCY OFFSET, RMS FREQUENCY OFFSET, AMPLITUDE-CORRELATION VERSUS FREQ. SEPARATION, AMPLITUDE - RESPONSE VERSUS FREQUENCY, SIGNAL FADING CHARACTERISTICS, VARIOUS HARMONIC DISTORTIONS, RMS/MEAN SIGNAL RATIO AND VARIOUS NOISE STATISTICS. ALGORITHMS ARE ADDED TO OBTAIN PREDICTED BIT ERROR RATES FOR SPECIFIED MODEMS.

↓

32 — ALLOW THE USER TO ENTER:

1) TITLE OF RUN
2) DATE
3) DESIRED SAMPLING FREQ.
4) FADING DETECTION THRESHOLD
5) NOISE BURST DET. THRESHOLD

PROCEDURES CALLED: OREAD, OWRITE

↓

34 — ACQUIRE A SET OF SAMPLES (DATA)

PERFORM FFT AND POWER SPECTRUM CALCULATION ON ONE BLOCK OF DATA.

PROCEDURES CALLED:
  OPRESET, OADCON, SOSPFFT

↓

36 — PROCEDURE MAXIMUM:
  DETERMINE TONE POWER AND FREQ. OFFSET FOR EACH TONE → (A)

FIG. 6a

PROCEDURE FADE CONTINUED:

LINK QUALITY ANALYZER

The programs identified in Table 1 and described throughout the specification are listed in the microfiche Appendix as an attachment to this specification.

BACKGROUND OF THE INVENTION

This invention relates to communication systems and in particular to high frequency (HF) communications systems that utilize channel-parameter-measurement and link-quality-evaluation systems.

High frequency radio communications have traditionally been a medium to provide economical, long and short distance non-line-of-sight communications. However, there are problems associated with the use of high frequency communication systems. These include degradation of the communication links through jamming, both intentional and unintentional, atmospheric conditions, multipath propagation, and interferences. U.S. Pat. No. 4,328,581 provided an adaptive communication system which measured and stored an elementary assessment of the link quality according to the channel and address of a station transmitting the message so that when a transmission is initiated to the station the best available channel is selected and utilized for communications.

The above referenced patent determined the link quality based upon the measured signal-to-noise ratio, the estimated bit error rate for a specialized test signal, or whether or not the channel was available. Although these parameters are useful in evaluating the link quality of a communication link, it has been found that additional information is required to achieve an accurate prediction of the overall link performance, especially for high-speed data-transmission channel applications. This additional information includes an accurate measurement of frequency-selective fading, time selective fading, a noise and interference profile and other variables which can be converted into useful general HF channel parameters and a link quality assessment.

SUMMARY OF THE INVENTION

In high frequency (HF) communications systems, such as those that operate within the frequency band of 3 to 30 MHz, it is desirable to ensure that the communication links between two radio stations operate on the frequencies having the best link quality. The link quality is often affected by atmospheric conditions, intentional jamming, and unintentional jamming caused by other transmitting stations. Link quality has traditionally been limited to merely the signal-to-noise ratio or whether or not the link was busy or jammed. However, there are other factors which can be measured that provide a more accurate indication of a communication link's quality from which the probability of obtaining transmission errors for that link may be extracted. These include, besides the signal-to-noise ratio, the interference profile, the multipath delay spread, the Doppler frequency spread, the frequency offset, the frequency amplitude correlation, frequency amplitude response, signal and noise envelope statistics, and harmonic/intermodulation products.

A link quality analyzer measures the link quality between a calling station and a called station by continuously transmitting a plurality of equal-amplitude signal tones. The called station receives the plurality of transmitting tones and samples them. A power spectrum is obtained of the received tones. From the statistics of the power spectrum the parameters of signal-to-noise ratio, multipath delay spread, Doppler frequency path spread, frequency, and the frequency amplitude correlation and other factors listed in the preceding paragraph are determined. The power spectrum of the plurality of tones is measured through the use of digital sampling techniques and digital Fast Fourier Transform techniques that are implemented through microprocessor-level technology.

The link quality analyzer is implemented in the configuration of a test-equipment-type terminal and also as part of an adaptive communication system which will automatically select the best link (frequency and/or route) for establishing communications between two stations, according to user-selectable optimization criteria.

BRIEF DESCRIPTION OF THE DRAWINGS

In order that the invention may be readily carried into practice, a number of embodiments will now be described in detail by way of example, with reference to the accompanying drawings in which:

FIGS. 6a through 6d are simplified flow diagrams of the software program used to operate the link quality analyzer signal processor of FIG. 4;

DETAILED DESCRIPTION OF THE PREFERRED EMBODIMENTS

Figure 1:
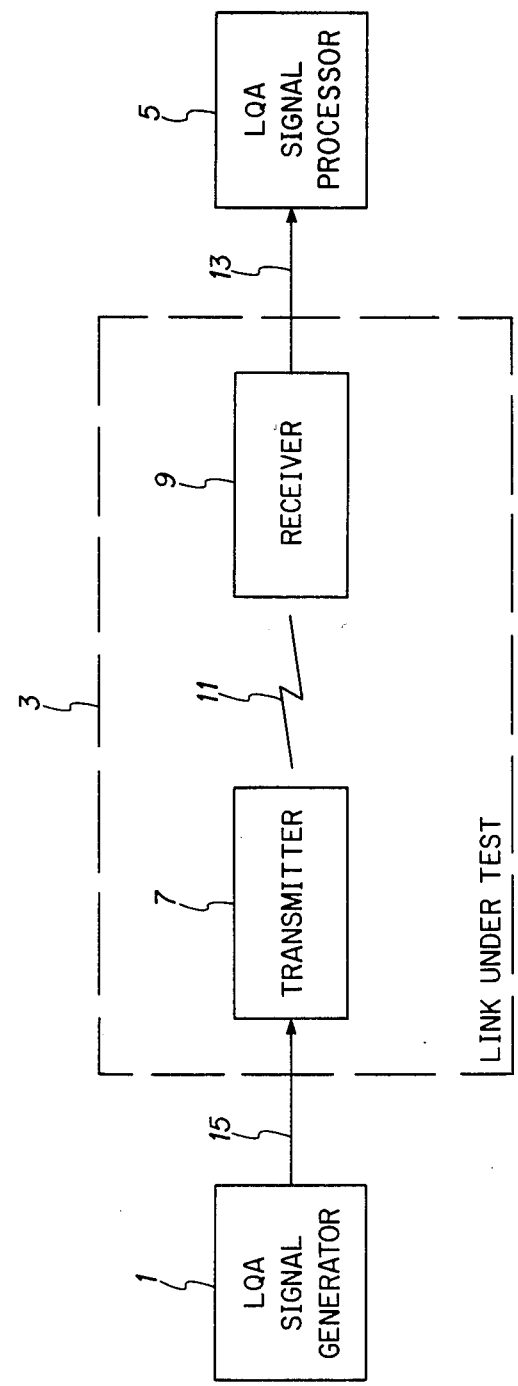
FIG. 1 is a block diagram of a link quality analyzer (LQA) configuration according to the invention.

FIG. 1, to which reference should now be made, provides a test configuration for measuring the link quality of a communication channel. A plurality of tones, which in the preferred embodiment is three or more separate tones, are provided by the LQA signal generator 1 and applied via conductor 15 to the link under test 3. The link under test in the preferred embodiment includes a transmitter 7 such as an HF transmitter and a receiver 9 which is joined to the transmitter 7 by a communication channel 11, with both the transmitter 7 and the receiver 9 operating on the same radio frequency, or by other conventional communications means. The receiver 9 receives the tones and applies them via conductor 13 to the LQA signal processor 5 which evaluates communication link(s) for the basic channel parameters.

Figure 2:
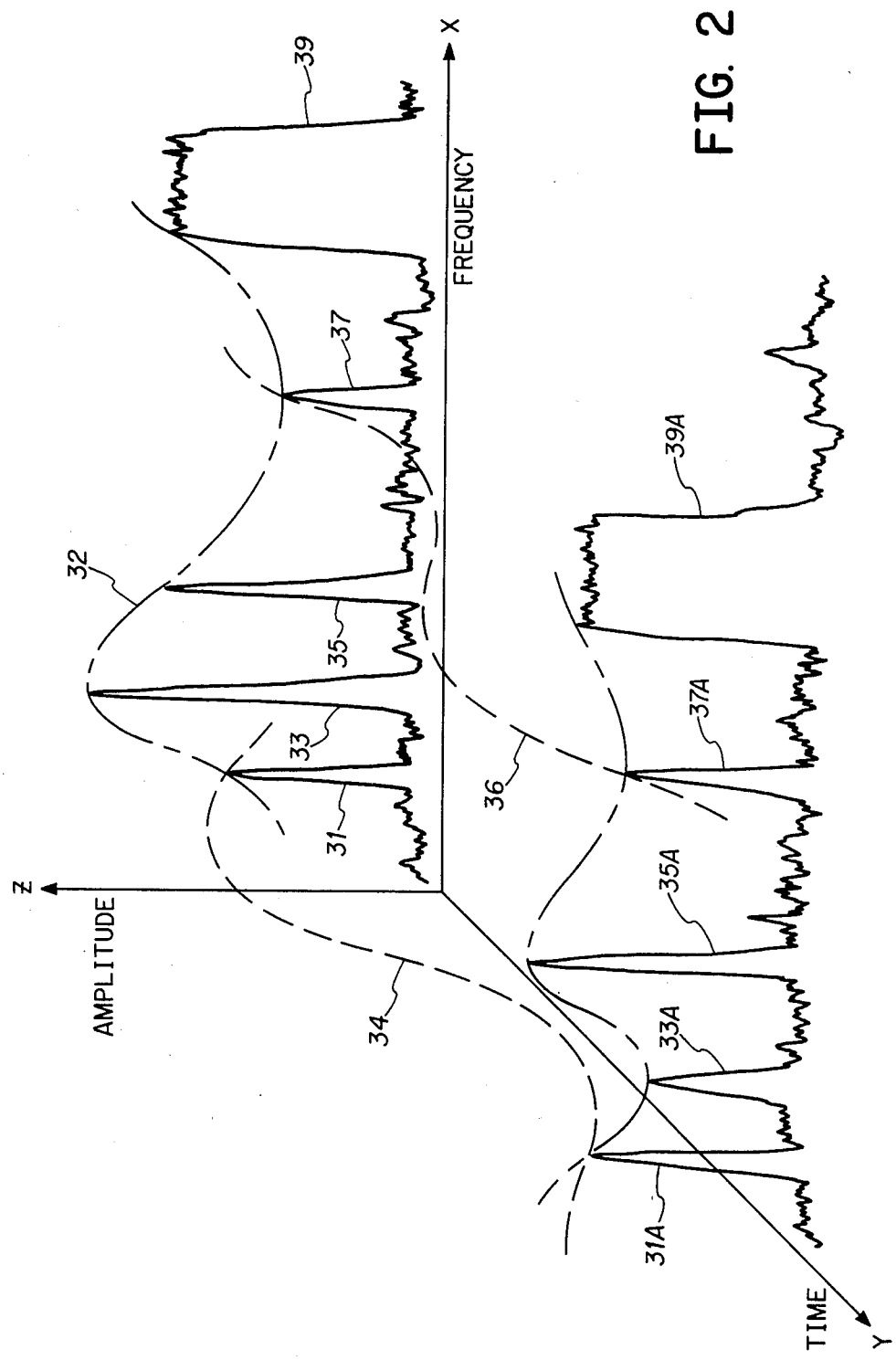
FIG. 2 is a waveform diagram illustrating the frequency and time domain representative of fading signal and noise.

FIG. 2, to which reference should now be made, illustrates graphically the parameters that are to be measured in the form of their power spectrum. The X axis of FIG. 2 represents frequency, the Y axis represents time and the Z axis represents the amplitude of the signals that are received by the receiver 9. The four tones are represented in FIG. 2 as peaks 31, 33, 35 and 37. It should be noted that the tones, although they are transmitted simultaneously, are separated in frequency as indicated by the power spectrum shown in FIG. 2. Frequency-selective fading is detected by comparing the amplitudes of the peaks 31, 33, 35 and 37. The variation in these amplitudes will indicate the frequencies upon which the link is subject to fading at one instant in time. Curve 32 is identified thus as the frequency-selective fading curve.

Curves 34 and 36 indicate that at different times the amplitude of a given tone peak will also vary. At a subsequent time, the tone envelope amplitudes may be as indicated by spectrum A. Consequently, the link quality measuring system (1 and 5) of FIG. 1 provides for transmitting the plurality of tones continuously for a given test transmission. In the preferred embodiment, it has been found that there should be approximately 15 seconds of transmissions of the four tones. The four selected tones have the following center frequencies: 1275, 1425, 1500 and 1800 Hz, each with a nominal bandwidth of 0 Hz. This plurality of tones is used in the preferred embodiment to provide for redundancy in parameter measurement to increase measurement accuracy for a minimal measurement time. In the invention, a minimum of two tones, separated by approximately 75 Hz, is required for multipath delay spread measurement means.

Power spectrum 39 indicates hypothetical narrowband interference within the receiver passband. Also indicated is the background noise-density level between tones. Waveforms 31A through 39A are subsequently received waveform signals that are received and processed by the link quality analyzer 5. By knowing the frequencies of the transmitted tones, the frequency offset (shift) is obtained from the frequencies of the received tones. Then the multipath delay spread and the frequency amplitude correlation are determined from the frequency-selective-fading envelope statistics of two or more received tones. The frequency spread is obtained from the time-selective-fading envelope statistics of one or more received tones. Additionally, the signal-to-noise ratio can be obtained from the measured power spectrum of the tones when compared to the noise power spectrum summed over selected portions of the spectrum excluding the tones. The measured noise spectral density that is represented by waveforms 39 and 39A is representative of aberrations in the noise spectrum, from which measures of the noise-profile may be obtained.

Additionally, signal and noise envelope statistics may be measured from the time variable spectrum envelopes. The harmonic and intermodulation products may be measured at spectrum portions corresponding to the product frequencies for the various transmitted tones. The amplitude response vs frequency may be determined from the average received power levels measured for the plurality of transmitted tones.

Figure 3:
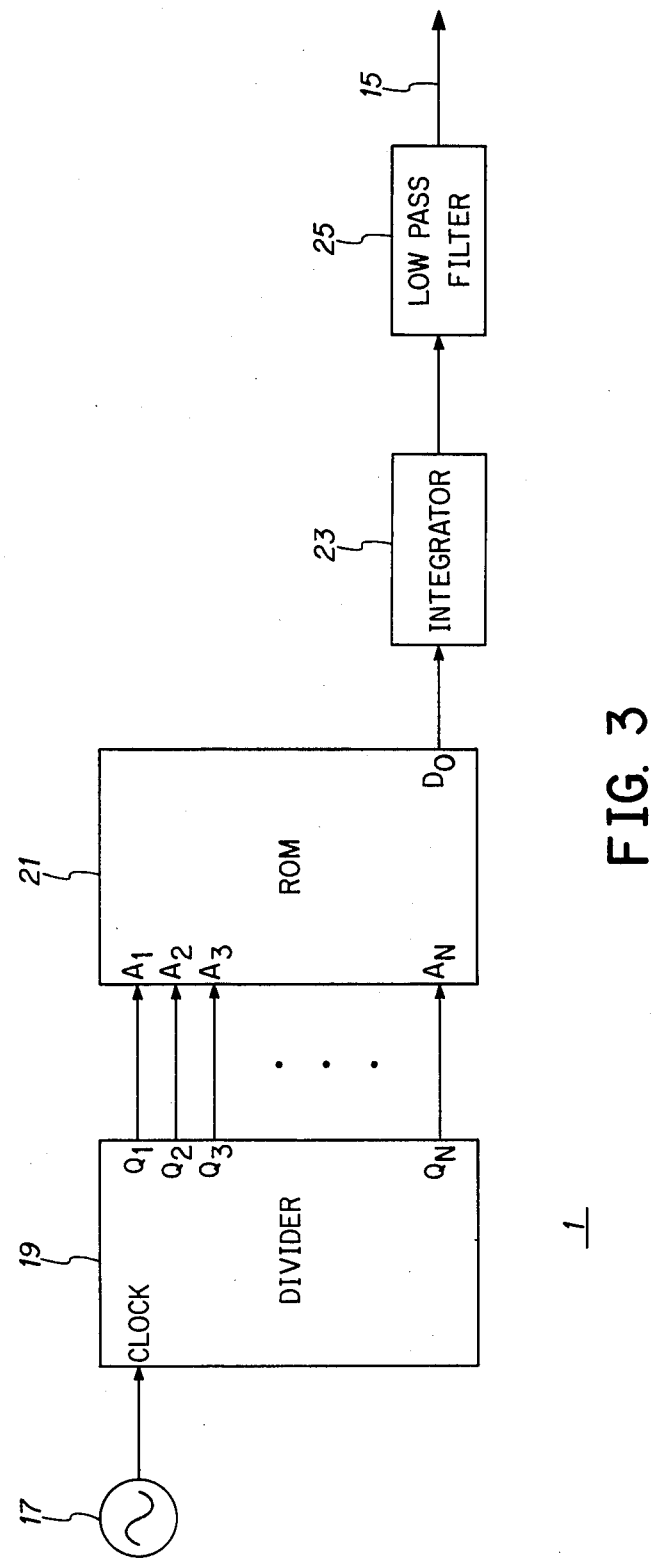
FIG. 3 is a simplified block diagram of a link quality analyzer generator according to the invention.

FIG. 3, to which reference should now be made, is a simplified block diagram of the LQA signal generator 1. An oscillator 17 provides a clock signal to a divider 19 which divides the clock by N and provides a plurality of divided outputs on the $Q_1$ through $Q_N$ terminals where N is a positive integer. The outputs of the divider 19 address a ROM 21 which provides on its output terminal, $D_o$, the logic state stored within the read-only-memory (ROM) according to the discrete address generated by the oscillator 17 and the divider 19 combination. The output of the ROM 21 is integrated by the integrator 23 which generates the signal tones for transmitting by the transmitter 7 of FIG. 1. A low-pass filter 25 removes the higher frequency noise spikes that occur in the addressing of, and data transfer from, the ROM 21. This noise is removed by the low-pass filter 25 and the filtered signal is applied to conductor 15 for transmitting by the transmitter 7. The integrator 23 integrates the logic zeros and logic ones in the same manner as a delta modulator operates. The preferred embodiment of FIG. 3 utilizes a single oscillator to provide four discrete frequencies which are combined and provided on the output conductor 15 for transmission by the transmitter 7.

Figure 4:
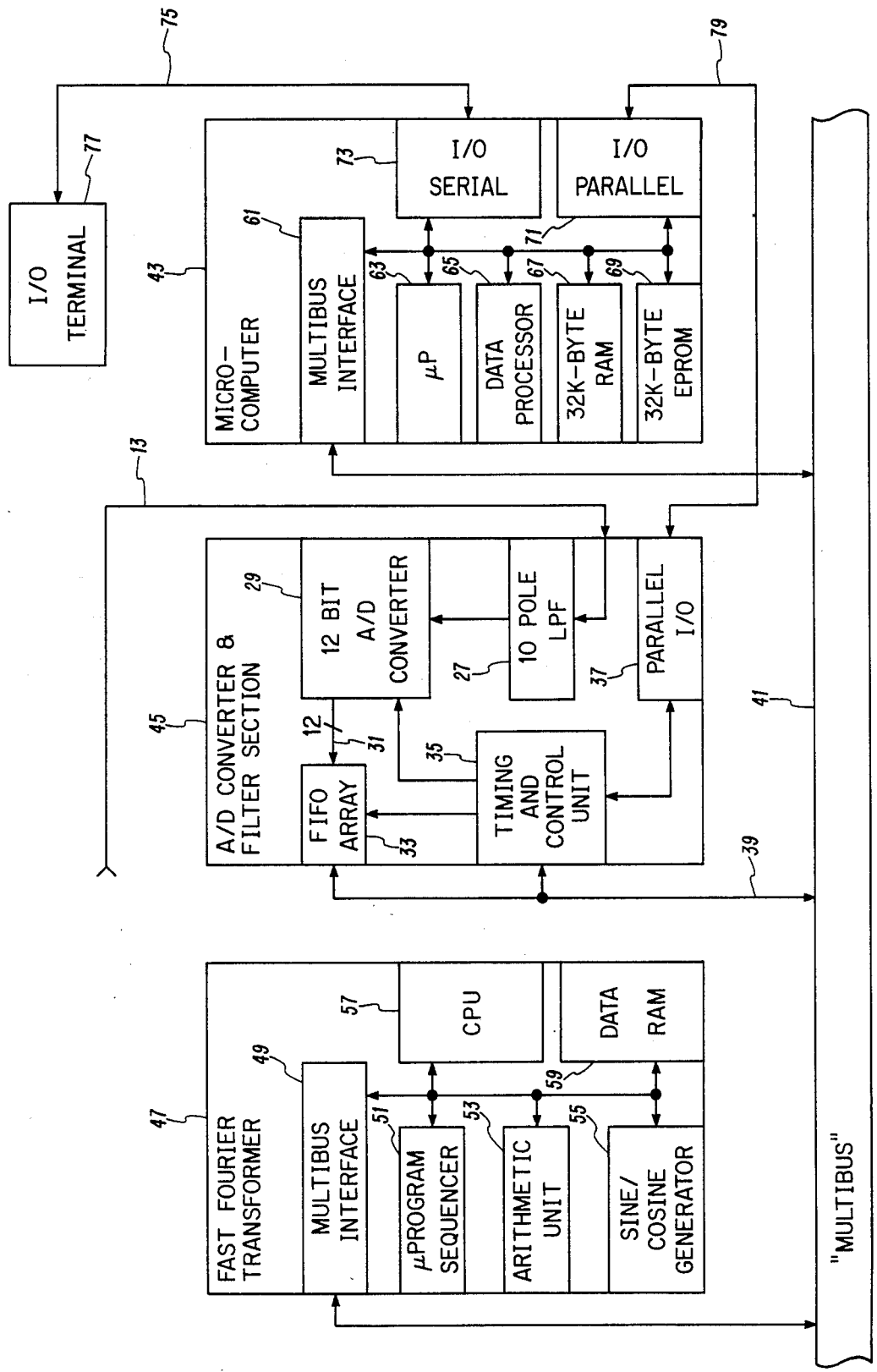
FIG. 4 is a block diagram of a link quality analyzer signal processor.

FIG. 4 is a block diagram of the LQA signal processor 5 and includes three basic units, a microcomputer 43, an analog-to-digital (A/D) converter and filter section 45 and a Fast Fourier Transformer 47. The received signal from the receiver 9 is conducted by conductor 13 to the LQA signal processor 5 where it is filtered by a anti-aliasing filter which in the preferred embodiment is a 10-pole low-pass filter 27. The filtered signal is applied to an A/D converter 29 which in the preferred embodiment is a 12-bit A to D converter. The A/D converter 29 not only converts the filter signal to a digital signal but it also functions as a sample-and-hold circuit. The A to D converter 29 holds on its output terminal the digital representation of the analog signal on its input terminal at the occurrence of a convert pulse provided by a timing and control unit 35. After converting the signal to digital form, the 12-bit A/D converter 29 transfer the digitized signal to a First-in/First-out (FIFO) memory array 33 by a 12 bit data bus 31. The operation of the 12 bit A/D converter 29 and the FIFO array 33 is handled by the timing and control unit 35 which is essentially a sequence counter that is initiated under command from the microcomputer 43 via an input/output (I/O) bus 79 and parallel input/output interfaces 71 and 37.

The digitized signal is transferred by the data bus 39 via the multibus 41 to a Fast Fourier Transformer 47. The Fast Fourier Transformer 47 in the preferred embodiment is a device such as the DSP-FFT-1 which is manufactured by DSP Systems Corporation Inc., Anaheim, Calif. Although it may be implemented by other techniques known in the art, the Fast Fourier Transformer 47 includes a multibus interface 49, a microprogram sequencer 51, an arithmetic unit 53, a sine/cosine generator 55, a data RAM 59 and a central processor unit (CPU) 57. The Fast Fourier Transformer 47 performs a time-domain-to-frequency-domain Fast Fourier Transformer on the digitized data. The Fast Fourier Transformer 47 transfers the transformed data via a multibus 41 to the microcomputer 43 and, in particular, to the multibus interface 61 of the microcomputer 43, where the Fourier transformed tones and noise spectral components are stored in a 32-kilobyte RAM 67. The microprocessor 43 calculates the link parameters and provides the information via a serial I/O interface 73 and a data bus 75 to an input/output terminal 77. The microcomputer 43 includes, as mentioned earlier, a multibus interface 61, a microprocessor ($\mu$P) 63, which in the preferred embodiment is an INTEL 8086 manufactured by INTEL Corporation of Santa Clara, Calif., a data processor 65, which in the preferred embodiment is an INTEL 8087 manufactured also by INTEL Corporation, a 32-kilobyte random-access memory (RAM) 67, a 32-kilobyte erasable programmable ROM (EPROM) 69, a parallel input/output interface 71 and a serial input/output interface 73. The control of the LQA signal processor 5 is handled through the I/O terminal 77 by an operator. The I/O terminal is a device such as a keyboard and a CRT terminal or a printer. A flow description of the operation of FIG. 4 is provided in FIG. 5 which is a flow diagram of the software in the microcomputer 43.

Figure 5:
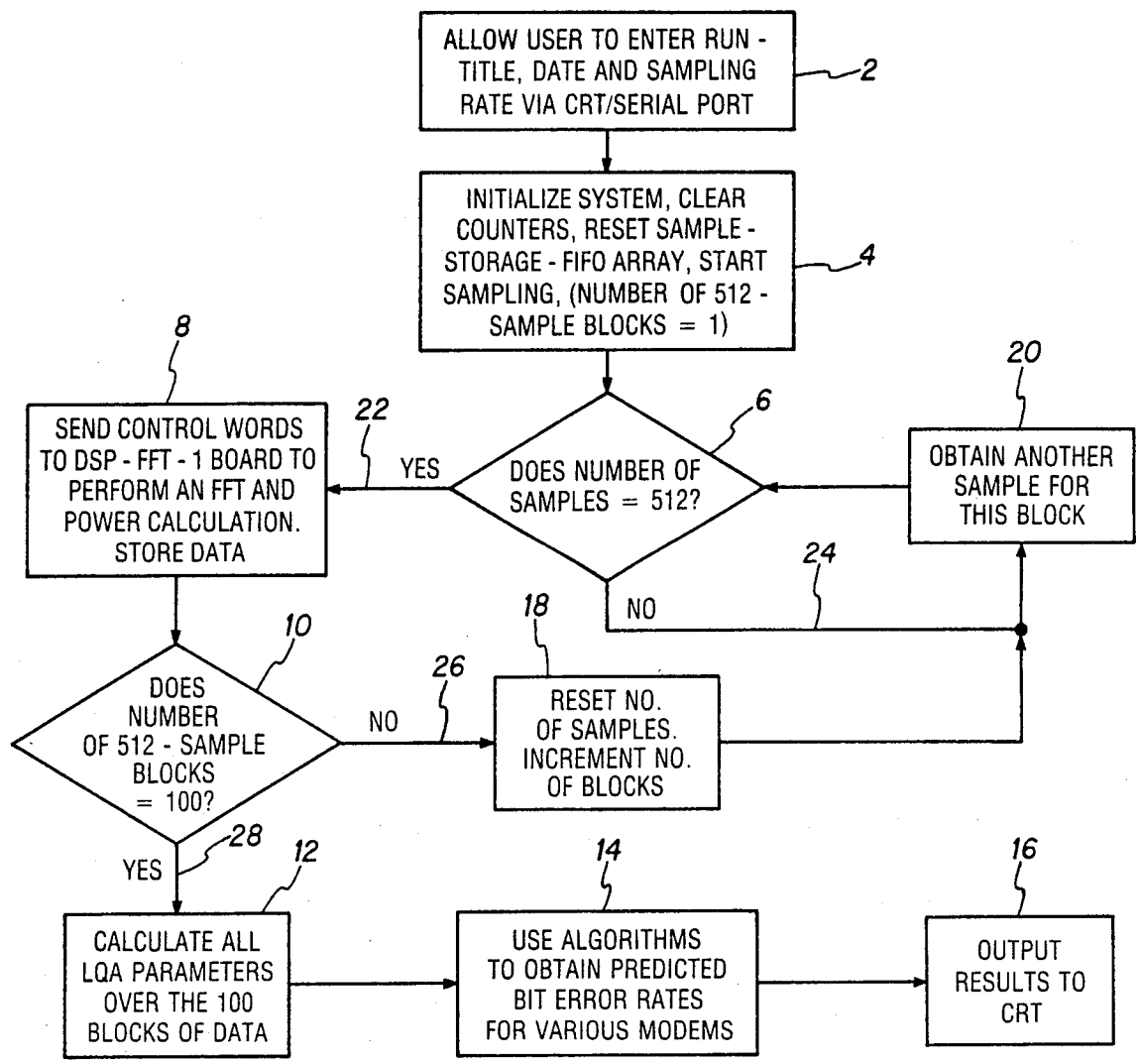
FIG. 5 is a simplified flow diagram of the operation of the link quality analyzer signal processor of FIG. 1.

In FIG. 5, to which reference should now be made and which should be used in conjunction with FIG. 4, the operator via the I/O terminal 77 will at block 2 enter the date and sampling rate, the rate that the timing and control unit 35 provides convert pulses to the A/D converter 29. At block 4 the LQA signal processor 5 is initialized, the system is cleared including the RAMS and the Fast Fourier Transformer 47 starts processing one through N data blocks of M samples each. In the preferred embodiment, N is equal to 100 blocks and M is equal to 512 samples of the tones plus noise. At decision block 6, the system checks on itself until it has collected M samples of data. If there is not M (or 512) samples of data collected then at block 20 the A/D converter 29 obtains another sample. After 512 samples have been obtained, then loop 22 is taken from processing block 6 where at processing block 8 the data is transferred to the Fast Fourier Transformer 47 and the Fourier Transform is obtained. The Fast Fourier Transformer 47 essentially transforms the data from the time domain to the frequency domain for handling by the microprocessor 43. Also, at processing block 8, the power spectrum is determined from the Fourier Transform of the 512 samples. The power is then stored according to the frequency in the 32-kilobyte RAM 67 at block 8. Decision block 10 checks to see if the unit has collected an adequate number of sample blocks N of M samples. As previously stated, in the preferred embodiment, N=100 and M=512. If there have not been 100 blocks of 512 samples collected then path 26 is taken where the number of samples is reset back to one at block 18; and at block 20 the system obtains a sample for the block that it is starting to fill. The parameters are determined from the power calculations that are stored in the RAM 67 at processing block 12, and then a prediction at processing block 14 is made as to the bit error rates for various equipment that would be used to transmit data over the link under test 3. These results are provided to the I/O terminal 77 at block 16.

Figure 6B:
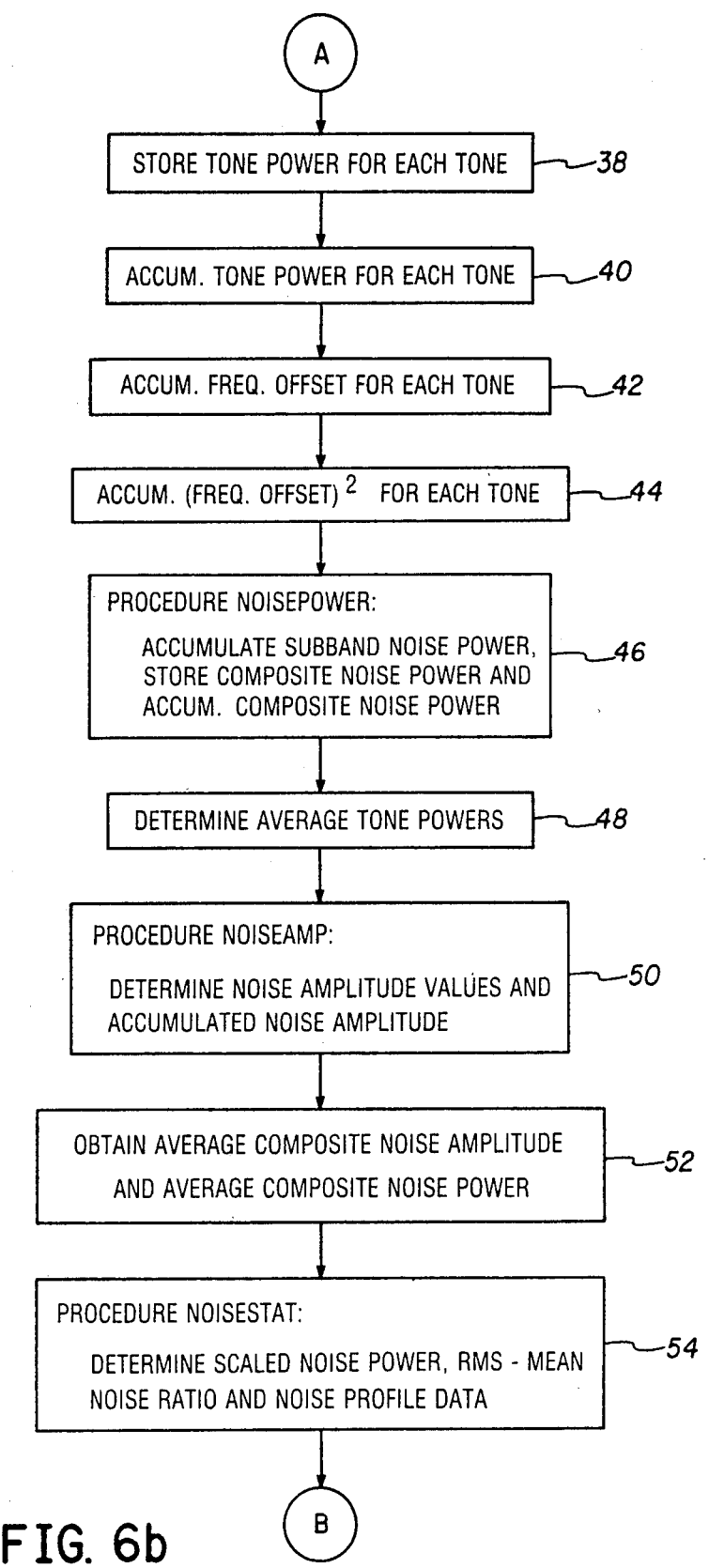

The microfiche appendix comprising one (1) sheet of 39 frames contains the software listing for the microcomputer 43. A simplified flow diagram for the software program that is contained within the microfiche appendix is provided in FIGS. 6a through 6d. In FIG. 6a, the functions that are performed by the program denoted by the mnemonic LQA86 are provided in block 30.

The parameters are signal-to-noise ratio, multipath delay spread for two tones, multipath delay spread for three tones, Doppler frequency spread, average frequency offset, RMS frequency offset, amplitude correlation versus frequency separation, amplitude response versus frequency, signal fading characteristics, harmonic and intermodulation distortions, RMS-to-mean signal ratio, noise profile, and various noise statistics. At block 32, the user will enter the title of the run, the date, the desired sampling frequency for controlling the 12 bit A/D converter which is essentially the repetition rate of the convert command, the fading detection threshold, and the noise detection threshold. The microcomputer 43 at block 34 will acquire a first block of data and perform the Fast Fourier Transform and the power spectrum calculation. At block 36, the tone power of each signal tone is determined as well as the frequency offset for each tone using a procedure called MAXIMUM. The tone powers for each tone are stored at block 38 and accumulated tone power is calculated at block 40. Additionally, the accumulated frequency offset for each tone is calculated at block 42 and the frequency offset squared is accumulated as indicated at block 44. At block 46 the total sampled noise and the accumulated noise power per subband are determined in equations 1 through 3 of the Table of Equations. Block 46 implements the procedure NOISEPOWER in which data is transferred from the 32 kilobyte RAM 67 that includes the power spectrum data for one block. The output at the end of the procedure NOISEPOWER will include noise power in selected subbands of the passband (excluding subbands containing LQA tones or subnoise) and the total noise power for all the selected subbands in one block which is denoted BLKNOISE. The average tone power is determined at block 48. The composite noise amplitude values and the accumulated noise amplitude are determined at block 50 using equations 4 through 6 of the Table of equations. The procedure NOISEAMP that is implemented at block 50 requires a transfer of the noise power values for each of the N blocks of data which is dubbed PWRNOISE and will provide at the completion of the calculations, performed by Equations 4 through 6 of the Table of Equations, the noise amplitude values for each of N equal to 100 blocks of data which is dubbed AMPNOISE and the sum of the noise amplitude values over N equal to 100 blocks of data, SUMAMPNOISE. At block 52, the average composite noise amplitude and the average composite noise power are determined. The scaled noise power and the RMS-to-mean noise ratio and noise profile data is determined at block 54 using equations 3 and 7 through 10 of the Table of Equations. Procedure NOISESTAT at block 54 requires the accumulated noise subband powers SUBNOISE, the average noise amplitude (AVEAMPNOISE and the average noise power AVEPWRNOISE and provides, after the completion of the calculations that are listed in the Table of Equations, the average noise subband power SUBNOISE, RMS/meannoise RATIO and average subband power to average composite noise power data PROFILE. Additionally, it may be necessary to have entered within the microcomputer 43 scale factors which are used as normalizing media throughout the Table of Equations.

Figure 6C:
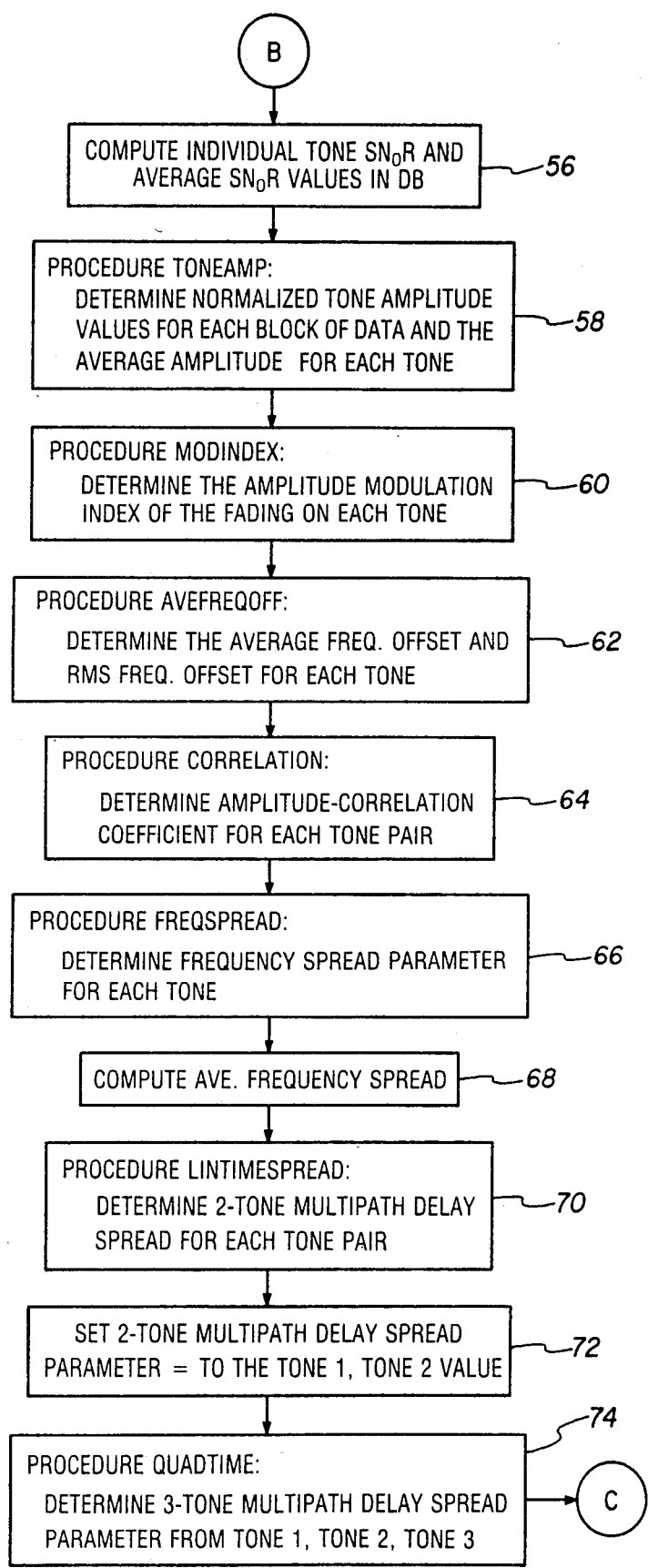
Figure 6D:
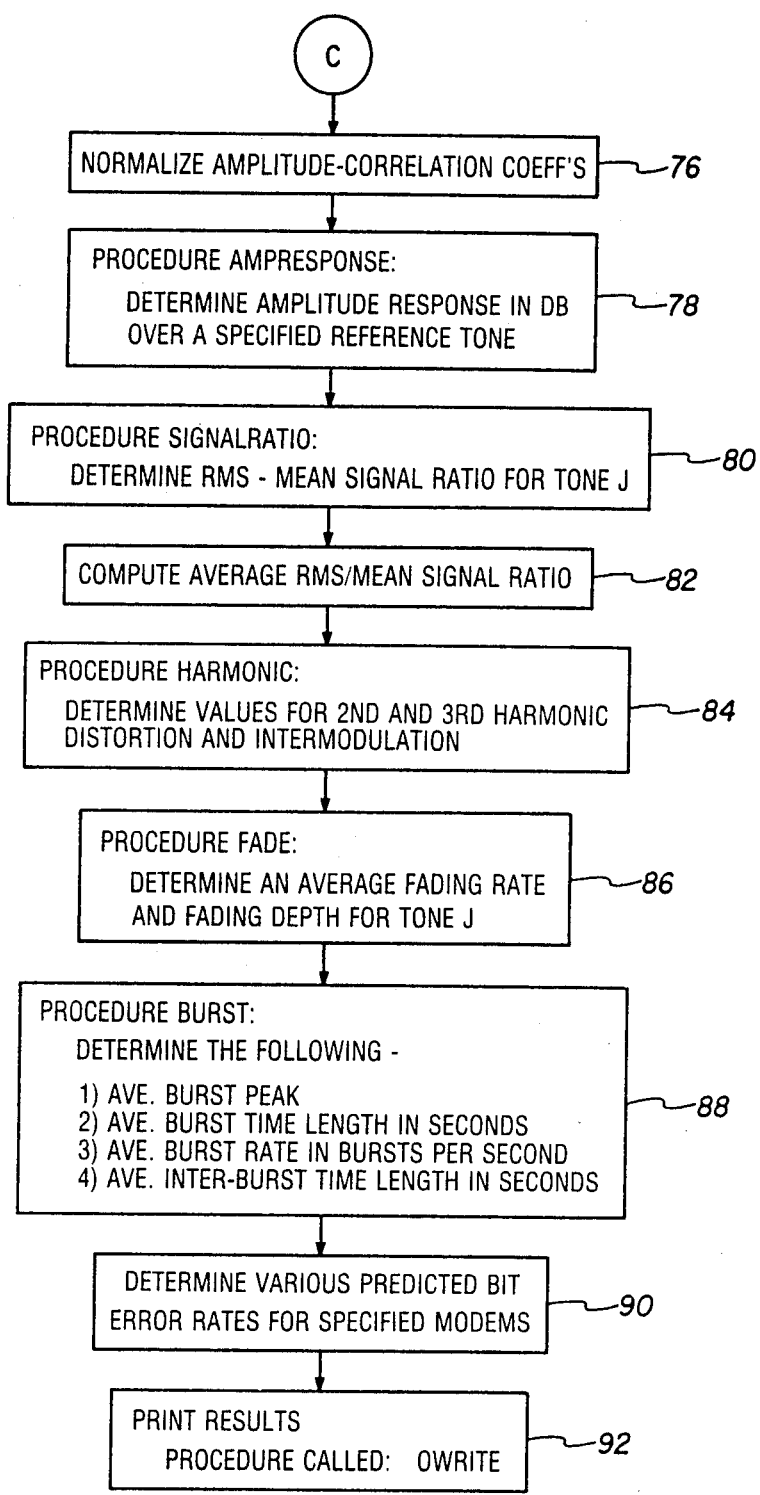

Following tie point B on FIG. 6c, the individual tone signal-to-noise ratio and the average signal-to-noise ratio is attained in decibels at block 56. In block 58, the microprocessor 43 then determines the average amplitude for each tone and the normalized tone amplitudes for each block of data, where block is defined in the preferred embodiment as 512 samples.

In block 58, Procedure TONEAMP requires the tone power values for each of 100 blocks of data TONEDATA and provides tone amplitude average TAVERAGE and normalized tone amplitude values for each of 100 blocks of data. Each value is normalized to the tone amplitude average and is dubbed TONEDATA in the Table of Equations. Equations 6, 11 and 12 illustrate the procedures used by the microcomputer 43 to obtain these values.

The amplitude modulation index of fading on each tone is determined at block 60 and the procedure is provided in the Table of Equations by equations 6, 13 and 14. Procedure MODINDEX requires the inputs of normalized tone amplitude values for each of 100 blocks of data in the case of the preferred embodiment, dubbed TONEDATA in the Table of Equations. The output from the implementation of Equation 14 of the Table of Equations is dubbed A and is the equivalent to an amplitude modulation index of the fading on each tone.

The average frequency offset and the RMS offset for each tone is performed by the computer software at processing block 62 and the equations 6, 15, 16 and 17 of the Table of Equations illustrate the procedures followed by the computer under the program control LQA 86 to implement this function. This procedure is denoted AVEFREQOFF and requires the frequency offset accumulated over 100 blocks of data which is denoted in the Table of Equations as FREQOFFSET and the accumulated squared value of the frequency offset over 100 blocks which is denoted SQROFFSET. The outputs after the completion of the procedures outlined in the Table of Equations provides the average frequency offset for each tone which is represented in the Table of Equations as AVEOFFSET and the RMS frequency offset value for each tone, RMSOFFSET.

In Block 64, the amplitude correlation coefficient for each tone pair is determined. This procedure is provided in the Table of Equations by equations 6, 18 and 19 and is denoted procedure CORRELATION. To implement the procedure CORRELATION the normalized tone amplitude values for each of 100 blocks are provided and the values for each two tones in turn are denoted TONEDAT1 and TONEDAT2. The completion of procedure CORRELATION provides the amplitude correlation coefficients which are represented by R in the Table of Equations for each tone pair.

Procedure FREQSPREAD is provided in block 66 in which the normalized tone amplitude values for each of 100 blocks of data, TONEDATA, is used to calculate the frequency spread which is dubbed DOPPLERCD. Block 66 provides the procedure for determining the frequency spread parameters for each tone as is outlined by equations 6, 20 and 21.

The average frequency spread is determined at block 68. Equations 6, 22 and 23 of the Table of Equations are used during block 70 to determine the two-tone multipath delay spread (MULTIPATHCM) in milliseconds for each tone pair with procedure LINTIMESPREAD.

In the preferred embodiment in block 72, the multipath delay spread parameter for the two-tone multipath delay spread is set equal to the tone-1, tone-2 pair value of MULTIPATHCM determined in the equations in block 70. At block 74, the three-tone multipath delay path spread parameters of the three lowest frequency tones that are simultaneously transmitted are performed by procedure QUADRATURE. Following the tie point c on FIG. 6d at block 76 the amplitude correlation coefficients are normalized to the value of amplitude correlation for zero frequency separation. The amplitude response in dB over a specified reference tone is determined in block 78 with procedure AMPRESPONSE and equation 24. The RMS-to-mean signal ratio for each tone is determined at block 80 using equations 25 and 26 from the Table of Equations and procedure SIGNALRATIO. The average RMS to mean signal ratio is determined at block 82. At block 84, procedure HARMONIC is used to determine the values for the second and third harmonic distortions and the two-tone intermodulation distortions and requires the received power for each tone summed over N blocks, where in the preferred embodiment N is equal to 100 and the power summation for each tone is given the mnemonic of PSUM$\tau$ where $\tau$ is equal to the tone number. Additionally, the subband noise powers summed over N blocks is also required for the procedure HARMONIC and is given the mnemonic of SUBNOISE. The outputs as provided by the Table of Equations provide the second harmonic distortion of tone 1 using equation 27 which is given the mnemonic HARMONIC2, the third harmonic distortion of tone 1 using equation 28 which is given the mnemonic of HARMONIC3, and the average intermodulation distortion using equations 29 and 30 of the Table of Equations which is given the mnemonic of INTERMOD.

At block 86, the average fading rate and the average fading depth for each tone is determined by procedure FADE.

At block 88 the composite noise burst statistics are determined by procedure BURST and include the average burst peak, the average burst time length in seconds, the average burst rate in bursts per second, and the average inter-burst time length in seconds. A burst is defined as the noise amplitude in time that exceeds a pre-established threshold. The length of a burst is defined as a period of time that a noise spike or pulse exceeds the pre-established threshold and the inter-burst interval is defined as a time between noise spikes which exceed the pre-established thresholds. The number of bursts that occur per second is then determined.

The predicted bit error rates for different equipments are determined at block 90. Because different modem configurations, which are discussed later, are potentially used, the above channel-parameter information, given the parameters of the different modems and the different types of signal modulation and error correction codes for transmission, enables the bit error rates to be predicted at decision block 90 and the results to be printed out at processing block 42.

| TABLE OF EQUATIONS |
| --- |
| (1) $\text{Blknoise} = \sum_{I=1}^{N} \text{Subnoise}[I]$ |
| (2) Subnoise [$I$] = Subnoise [$I$] + Sum of the Magnitudes of the Power Spectral Lines in Subband $I$ |
| (3) $N$ = Number of Noise Subbands ə $I$ = Any Value from 1 to $N$ for all cases |
| (4) Ampnoise [$I$] = (Pwrnoise [$I$])$^{\frac{1}{2}}$ |
| (5) $\text{Sumampnoise} = \sum_{I=1}^{N} \text{Ampnoise}[I]$ |
| (6) $N$ = Number of blocks of Data |
| (7) $\text{Subnoise}[I] = \dfrac{\text{Subnoise}[I]}{\text{Total Number of Blocks} = \text{in the preferred embodiment 100}}$ |
| (8) $\text{Ratio} = \dfrac{\sqrt{\text{Ave Pwr Noise}}}{\text{Ave Amp Noise}}$ |
| (9) Ave Pwr Noise = (Scale Factor) * Ave Pwr Noise |

-continued
TABLE OF EQUATIONS

(10) $$\text{Profile } [I] = 4.343 \text{LN} \left( \frac{\text{Subnoise } [I]}{\text{Ave Pwr Noise}} \right)$$

(11) $$T\text{average} = \frac{1}{N} \sum_{I=1}^{N} (\text{Tone Data } [I])^{\frac{1}{2}}$$

(12) $$\text{Tone Data } [I] = \frac{(\text{Tone Data } [I])^{\frac{1}{2}}}{T/\text{Average}}$$

(13) $$\text{Sum} = \sum_{I=1}^{N} (\text{Tone Data } [I] - 1.0)^2$$

(14) $$A = \sqrt{\frac{\text{Sum}}{7.07}}$$

(15) $$A\text{veoffset} = \frac{\text{Freqoffset}}{N}$$

(16) $$\text{Temp} = \frac{\text{Sqroffset}}{N}$$

(17) $\text{Rmsoffset} = [\text{Temp} - (A\text{veoffset})^2]^{\frac{1}{2}}$

(18) $$\text{Sum} = \sum_{I=1}^{N} \text{Tonedata1}[I] \cdot \text{Tonedata2}[I]$$

(19) $$R = \frac{\text{Sum}}{N}$$

(20) $$\text{Sum} = \sum_{I=1}^{N-1} (\text{Tonedata}(I+1) - \text{Tonedata } [I])^2$$

(21) $$\text{Doppler } CD = \frac{\sqrt{2}}{(0.12)\pi} \sqrt{\frac{\text{Sum}}{N-1}}$$

(22) $$\text{Sum} = \sum_{I=1}^{N} (\text{Tonedat1}[I] - \text{Tonedat2}[I])^2$$

(23) $$\text{Multipathcm} = \frac{(1000)(\sqrt{2})}{|\text{Tonefreq1} - \text{tonefreq2}|\pi} \sqrt{\frac{\text{Sum}}{N}}$$
Where tone frequencies for Tone1 = Tonefreq1, and tone2 = Tonefreq2

(24) Amplitude Response in db, AmpydB =

$$4.343\text{LN} \left( \frac{\text{Tone Power } \gamma}{\text{Ref Power}} \right)$$

where $\gamma$ = Tone being analyzed

(25) Ratio = (Tonepower)$^{\frac{1}{2}}$
Tonepower = average tone power over $N$ block of data
$N$ = 100 in the preferred embodiment

(26) Ratio = Ratio/Tone Amp
ToneAmp = Tone amplitude one $N$ blocks of data,
$N$ = 100 in the preferred embodiment

(27) $$\text{Harmonic2} = 4.3\text{LN} \left( \frac{\text{Tone1 Power } (P\text{Sum}I)}{\text{Power at 2 Tone1 Frequency}} \right)$$

(28) $$\text{Harmonic3} = 4.343\text{LN} \left( \frac{\text{Tone1 Power } P\text{sum}I}{\text{Power at 3*Tone1 Frequency}} \right)$$

(29) For each pair of tones $i$ and $j$
$IM (i,j)$ = (Scale factor) $\times$ $$\frac{P\text{sum}i + P\text{sum}j}{\text{Subnoise Power of Frequency}|j - i|}$$

-continued
TABLE OF EQUATIONS

(30) $$\text{Intermod} = 4.343\text{LN} \left( \frac{1}{M} \sum^{M} IM(j,i) \right)$$

$M$ = a positive integer
   = number of tone pairs contributing

Figure 7:
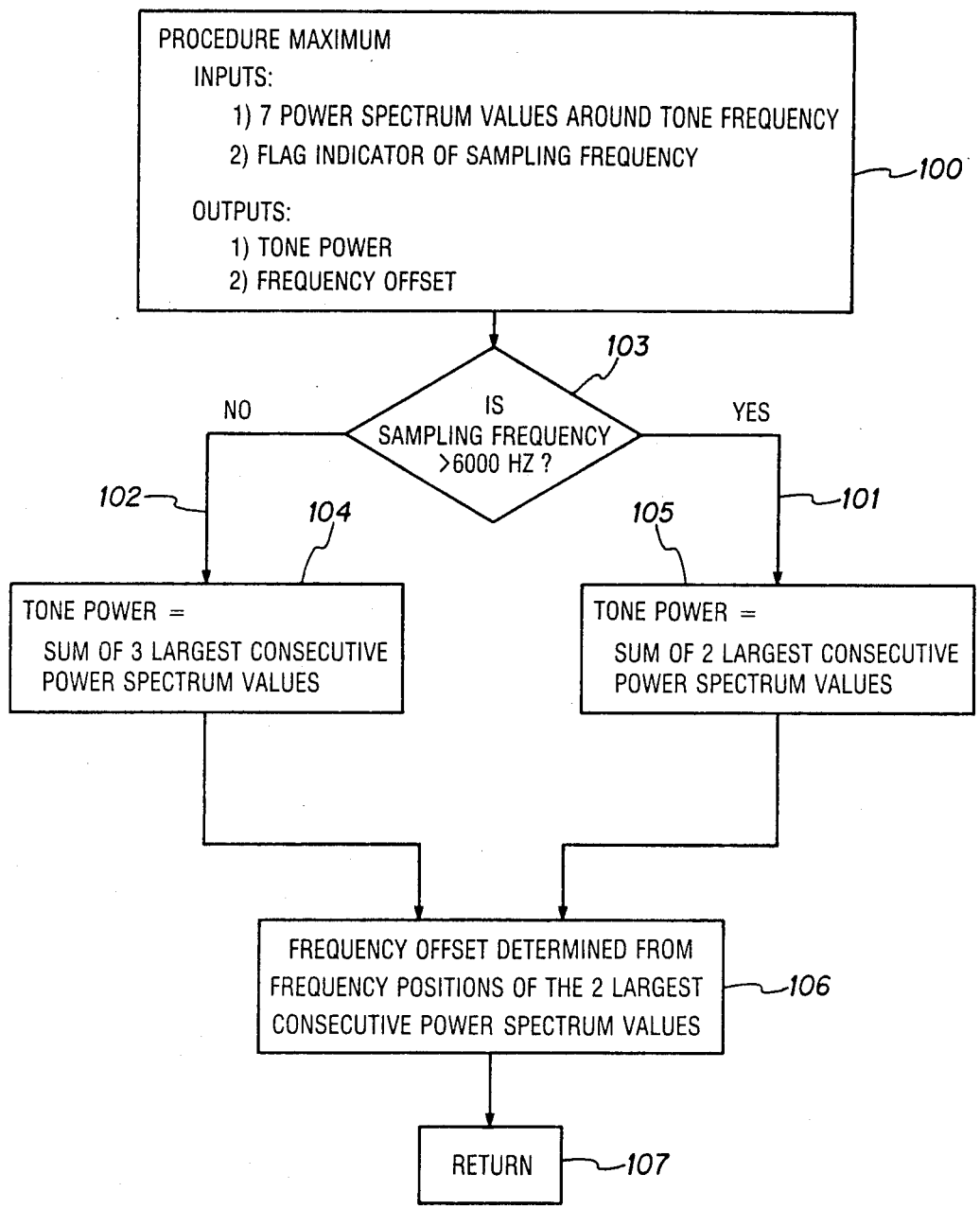
FIGS. 7, 8, 9a, 9b, 10a, 10b, 10c are simplified flow diagrams of some of the procedures of the program of FIG. 6.

FIG. 7 provides the procedure for determining the tone powers and frequency offset for each tone and is dubbed as procedure MAXIMUM. In FIG. 7, the procedure is activated at block 100 where the power spectrum values around the tone frequencies and the flag indicator of sampling frequency are obtained. At decision block 103, the unit decides if the sampling frequency is greater than or less than a preselected value, which in the preferred embodiment is 6 KHz. If as in the preferred embodiment the sampling frequency is greater than 6 KHz then path 101 is taken in which the tone power at block 105 is taken for the sum of the two largest consecutive power spectrum values within a range of the nominal frequency. If the sampling frequency is not greater than 6 KHz then the tone power for the three largest consecutive power spectrum values is taken at block 104. At block 106 the frequency offset is determined from frequency portions of the two largest power spectrum values and at block 107 the unit is returned to implement the next procedure which would be performed at block 38 of FIG. 6a.

Figure 8:
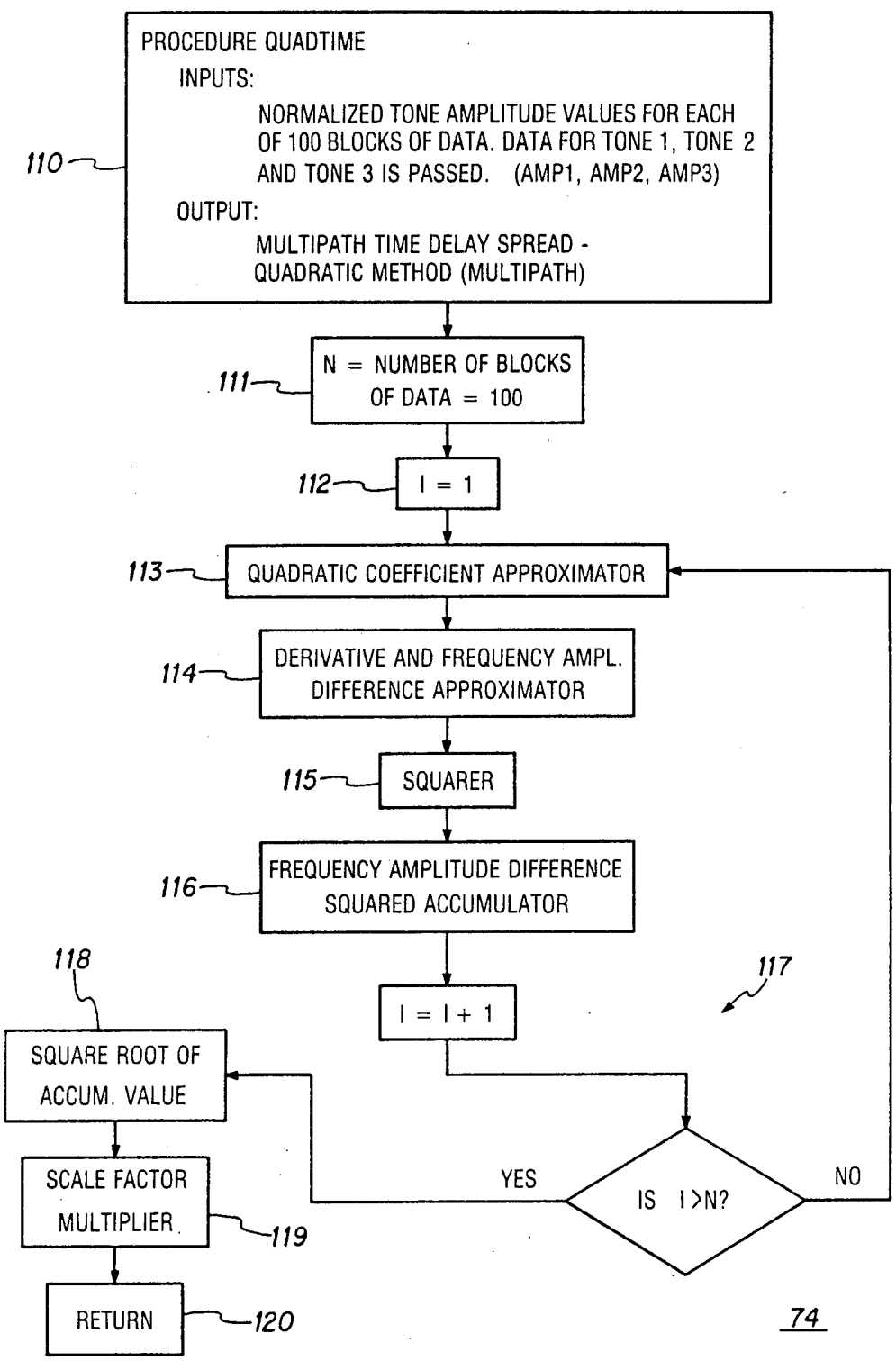

FIG. 8 provides the procedure for determining the three-tone multipath delay spread which is dubbed procedure QUADTIME at block 74. Procedure QUADTIME requires the normalized tone amplitude values for each of N blocks of data for each of tones 1, 2 and 3. Data for tone 1, tone 2, tone 3 is passed and dubbed amp1, amp2 and amp3. The output will provide the multipath time delay spread, dubbed MULTIPATH, by a quadratic method MULTIPATH. At block 111 the system is initialized and N is set in the preferred embodiment to be 100 and I is equal to 1 at block 112. The quadratic-equation coefficient approximation is determined at block 113 for each block of data using any of various standard methods for the solution of three simultaneous equations in three unknowns readily available and then the amplitude derivative with respect to frequency and then the frequency-amplitude difference approximations are determined by algebraic methods at block 114. This frequency-amplitude difference is squared at block 115 and at block 116 the frequency amplitude difference squared is accumulated. The unit then moves on the loop 117 until I is greater than N. At block 118 the square root value of the accumulation is determined and the scale-factor multiplier is determined at block 119, after which the microcomputer 43 turns to perform the block 76 of FIG. 5.

Figure 9A:
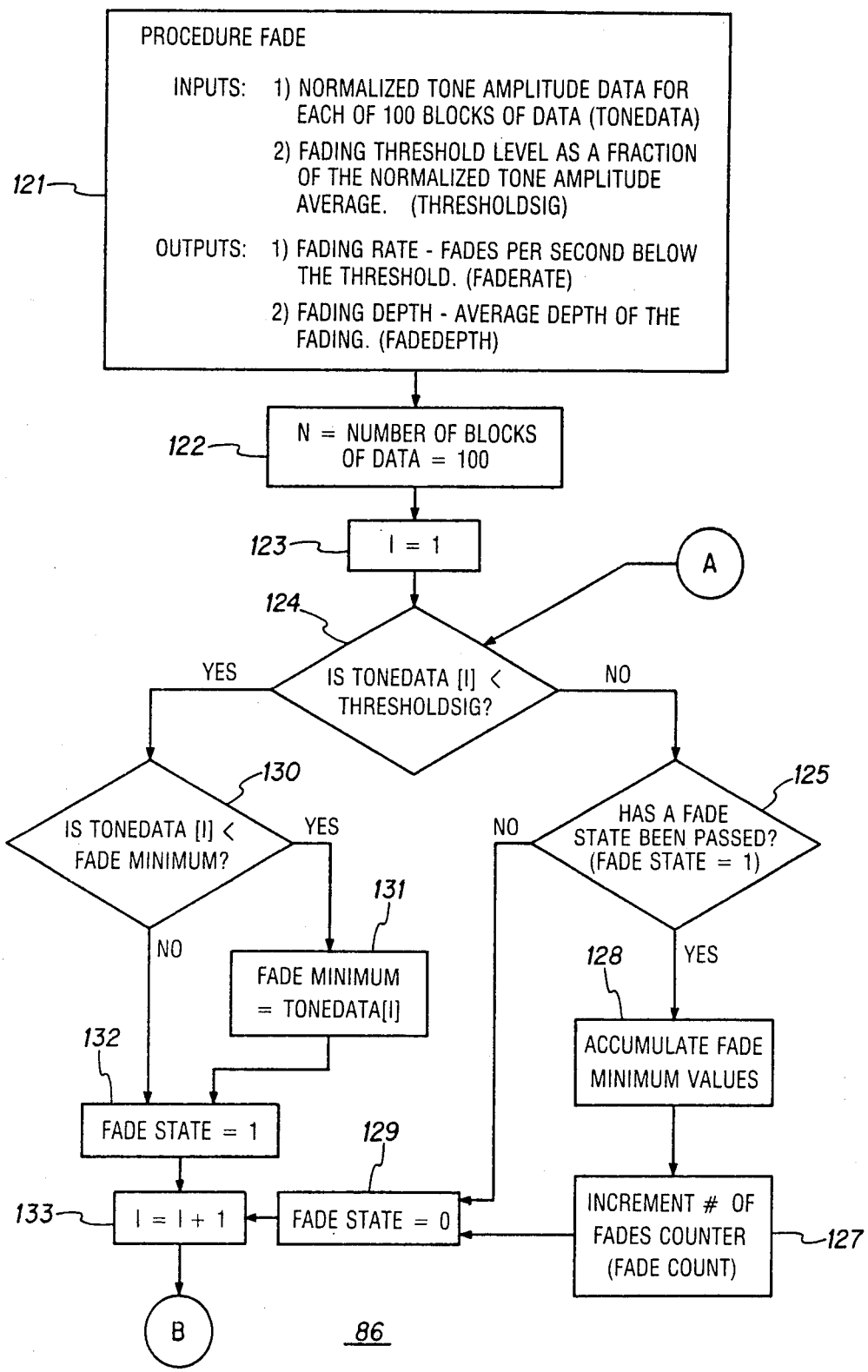
Figure 9B:
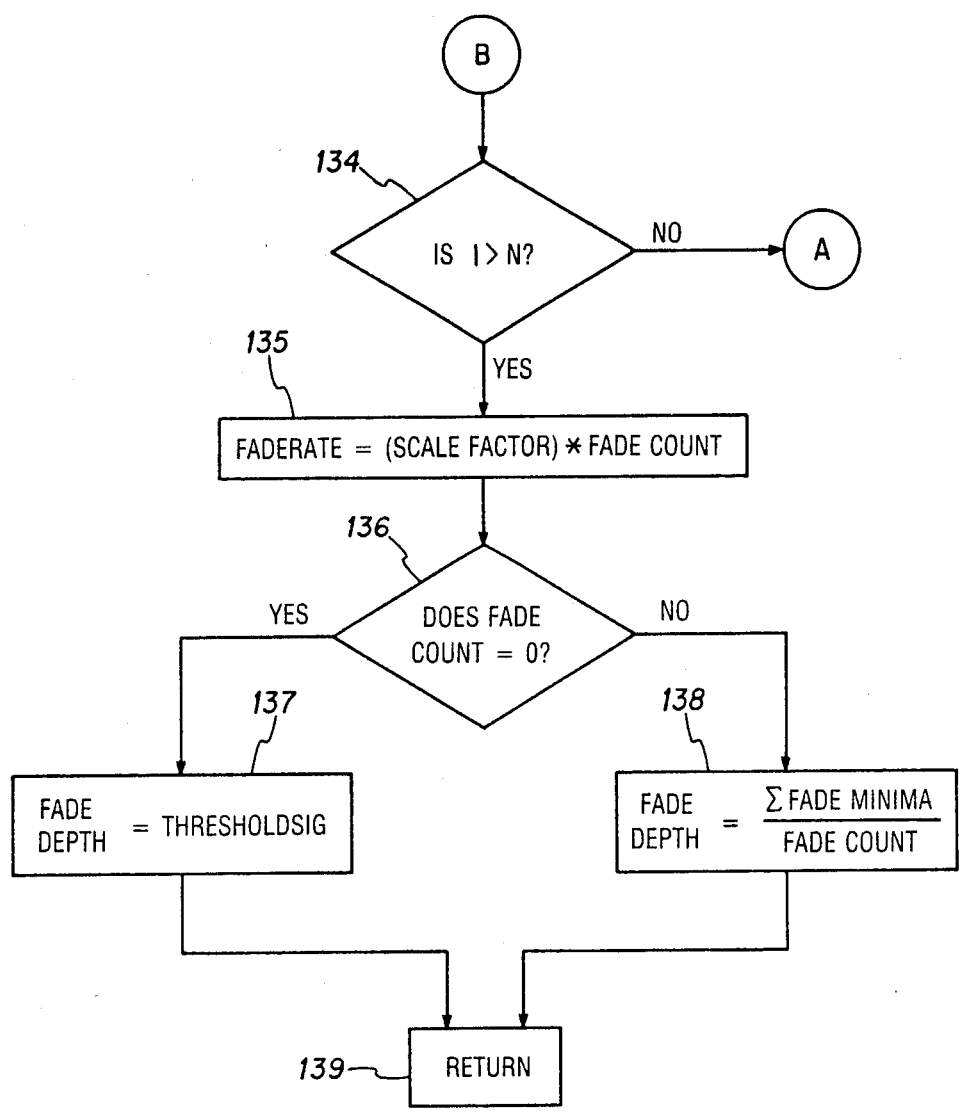

FIGS. 9a and 9b illustrate the procedures or steps that are implemented to perform the procedure fade which is to determine the average fading rate and fading depth for each tone. The inputs which are obtained from the RAM 67 of the microcomputer 43 include the normalized tone amplitudes data for each of the 100 blocks of data, hereafter referred to as TONEDATA, and a fading threshold level as a fraction of normalized tone amplitude average. The outputs will be the fading rate (fades per second below the threshold), and fading depth, which is defined as the average depth of the fading. Of course, the system is set to process, in the preferred embodiment 100 blocks of data at block 122. The first block is taken at step 123. A decision step 124 determines if each TONEDATA is greater than the threshold. If it is less than the threshold then the microcomputer 43 will step to decision block 125 which checks to see if the fade state exists at block 125. If the answer is yes, the fade minimum (depth) is accumulated at block 128 and the number of fades is incremented at block 127 and the fade state is again set equal to zero at block 129. Returning to block 124, if the TONEDATA is less than the threshold, control passes to processing block 130 where, if the tone data is less than the fade minimum, the fade minimum is set equal to the tone data at block 131. Step 132 sets the fade state to one and at block 133 the data block counter is incremented by one at which point tie point B connects FIG. 9 to FIG. 9b. If the number of blocks is less than N (or 100 for the preferred embodiment) at tie point A the unit returns to decision block 124. If there have been 100 blocks of 512 samples of data analyzed then at block 135 the fade rate is determined from the fade count and at decision block 136 a check is made to see if the fade count is equal to zero. If it is not then the fade depth is determined at block 138 by the equation enumerated therein and if the answer is yes then the fade depth is equal to the threshold and the unit returns at block 139 to perform procedure BURST at step 88.

Figure 10A:
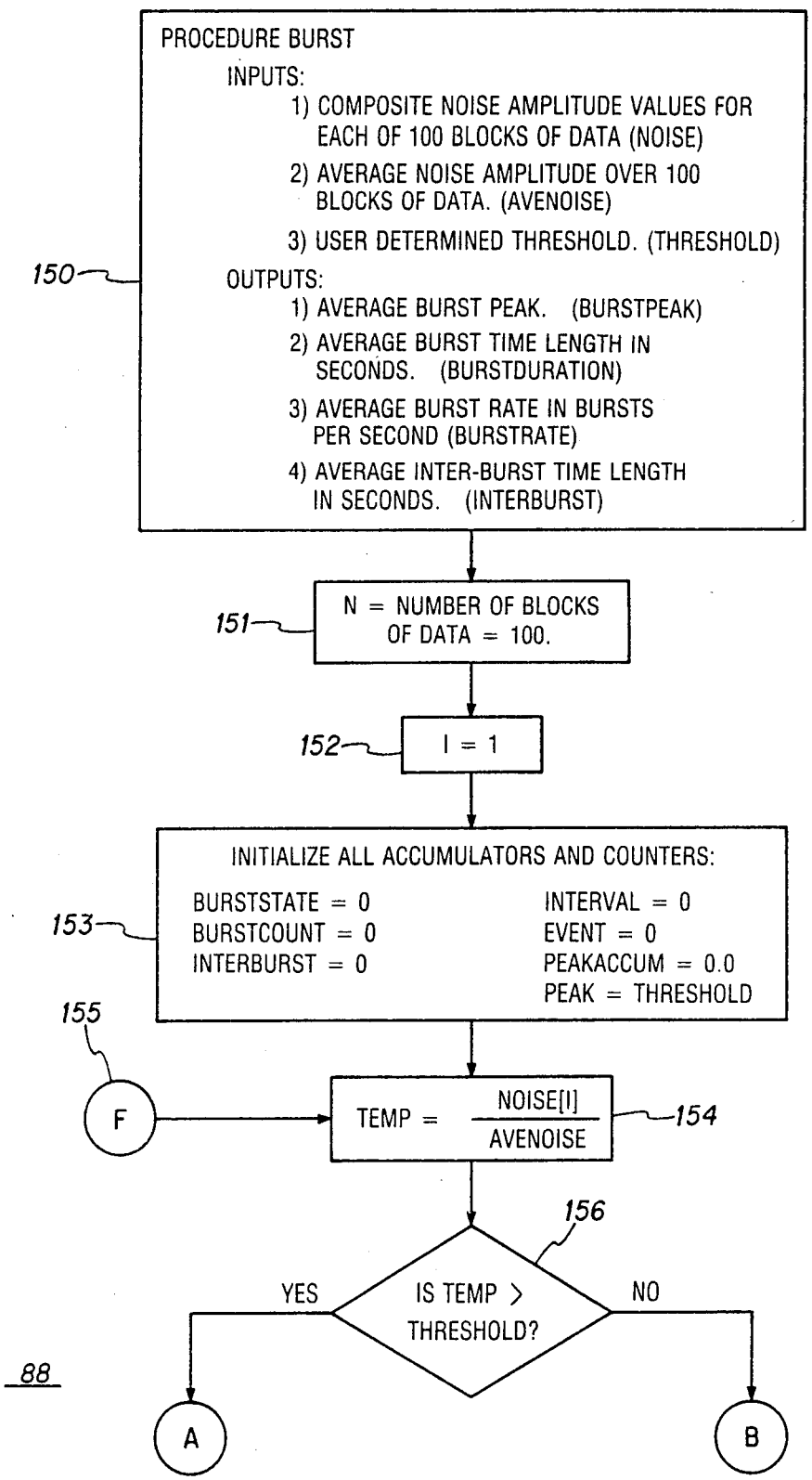
Figure 10B:
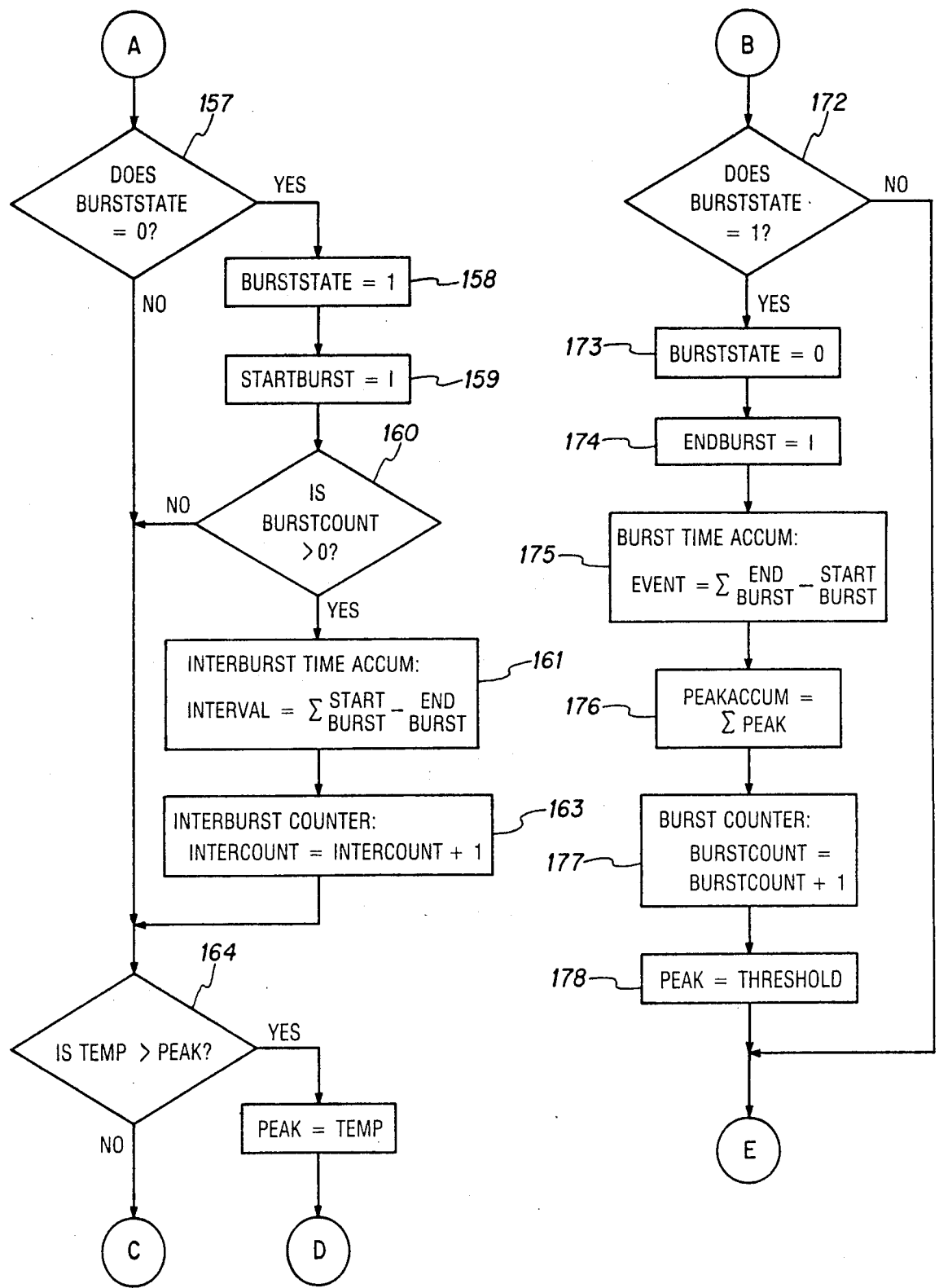
Figure 10C:
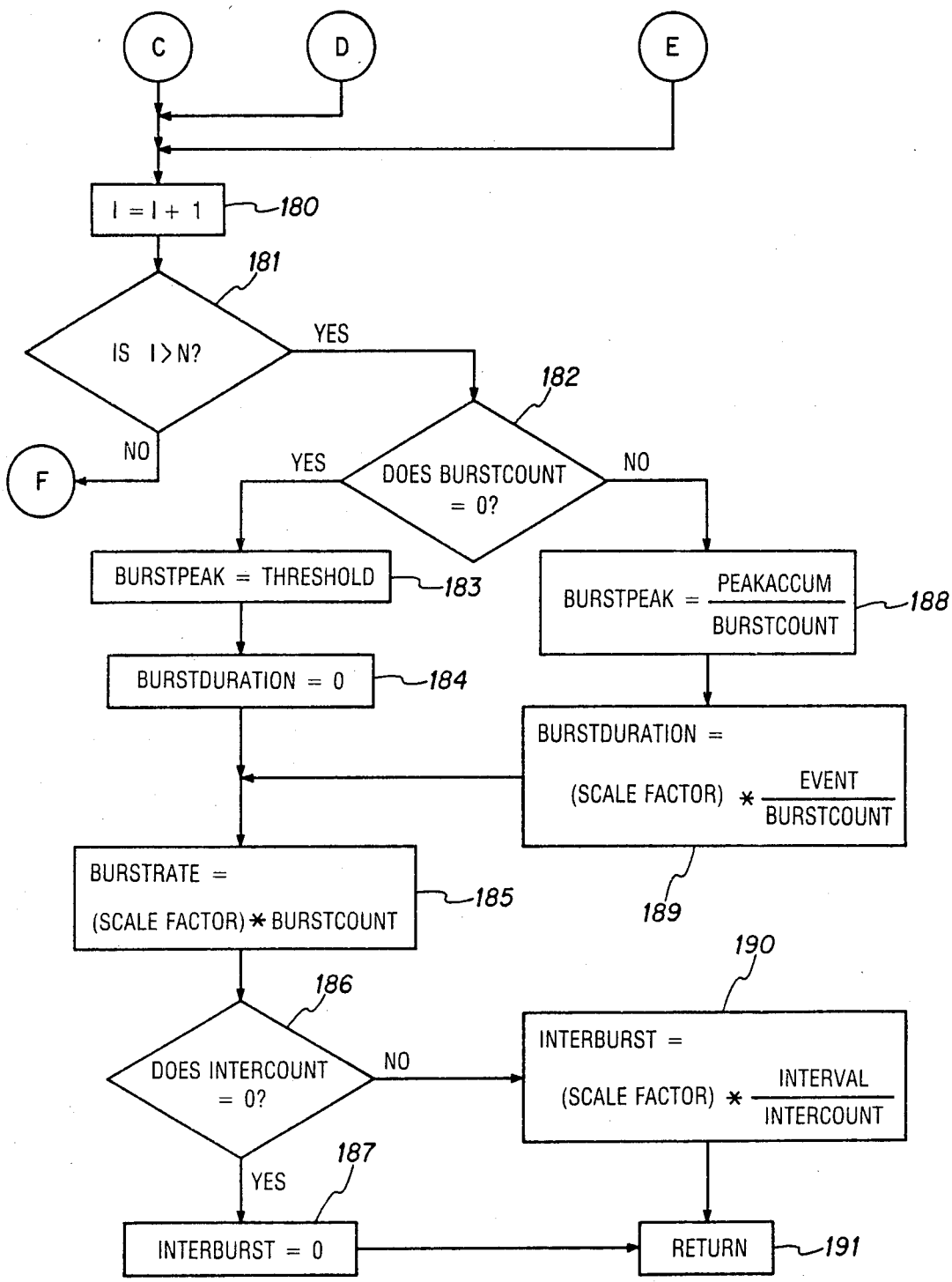

The Procedure BURST step that is implemented at block 88 is described by FIGS. 10a through 10c. The inputs are obtained from the RAM 67 and include the composite noise amplitude values for each of the 100 blocks of data hereafter referred to as NOISE, the average noise amplitude over 100 blocks of data and the noise-burst threshold as determined by the user of the LQA signal processor. The outputs will include the average burst peak which is called BURSTPEAK, the average burst time in seconds which is hereafter referred to as BURSTDURATION, the average burstrate in seconds hereafter referred to as BURSTRATE and the average interburst time length in seconds hereafter referred to as INTERBURST. Blocks 151 and 152 set the stage for taking the first block of data for analyzing and the number of blocks is set for 100 in the preferred embodiment. The different counters including the BURSTSTATE, the BURSTCOUNT, INTERBURST, INTERVAL, PEAKACCUMUL and the PEAK are initialized at block 153. The noise-to-average noise ratio is taken at block 154 and designated as TEMP, which is a temporary value. At decision block 156 the question, is the temporary value greater than the threshold, is asked. If the answer is yes, then tie point A is taken to FIG. 10b and if the answer is no, then tie point B is taken to FIG. 10b. Following the situation where the temporary value is greater than the threshold value at tie point A on FIG. 10b the first step determines whether the BURSTSTATE equals zero. If the answer is no, the unit steps to block 164 where the question is asked; is the temporary value greater than the peak value? However, looking at the situation where BURSTSTATE is equal to zero, then at block 158 the BURSTSTATE is set to one and the start of the burst is taken or initialized at block 159 by setting the STARTBURST indicator equal to I. Then at block 160 the BURSTCOUNT is checked to ensure that it is greater than zero. If the answer is no, then the unit jumps from block 160 to decision block 164. If the answer is yes, then the interburst time accumulation is taken by the equation outlined in block 161 for INTERVAL. The interburst counter, INTERCOUNT, is incremented at block 163 after which the unit steps to decision block 164.

In the situation where the temporary value is greater than the threshold then following tie point B the question is asked, at decision block 172, is the BURSTSTATE equal to one? If the answer is no, the unit steps to tie point E. If yes, the BURSTSTATE is set equal to zero at block 173. The ENDBURST counter is set equal to the block of data I at step 174 and the burst time accumulation is determined using the equations contained within block 175. The PEAK accumulation is determined at block 176 and the BURSTCOUNTER is incremented at block 177 after which the PEAK is set equal to the threshold at block 178. Tie points C, D and E connect FIG. 10b to FIG. 10c where the block counter is incremented and if the number of blocks is less than N then the unit steps back to the tie point F of FIG. 10a. When the burst procedure has been implemented for the total of N blocks, then the unit steps to decision block 182 where the BURSTCOUNT is checked to see if it equals zero. If the BURSTCOUNT is not equal to zero then the BURSTPEAK is determined at step 188 and the BURSTDURATION is determined at step 189. If on the other hand the BURSTCOUNT is equal to zero, BURSTPEAK is set equal to the threshold at step 182 and the BURSTDURATION is equal to zero at step 184. The BURSTRATE is calculated by the equation contained within step 185. At decision step 186, the microcomputer checks to see if the INTERCOUNT equals zero; if it does then the INTERBURST is set equal to zero at block 187. If, on the other hand, the intercount does not equal zero the interburst accumulator is updated with the value obtained in processing block 190. In either case at block 191, the unit returns to perform the procedure outlined in FIG. 6d at block 90 to determine the various predicted bit error rates for specified modems.

Figure 11:
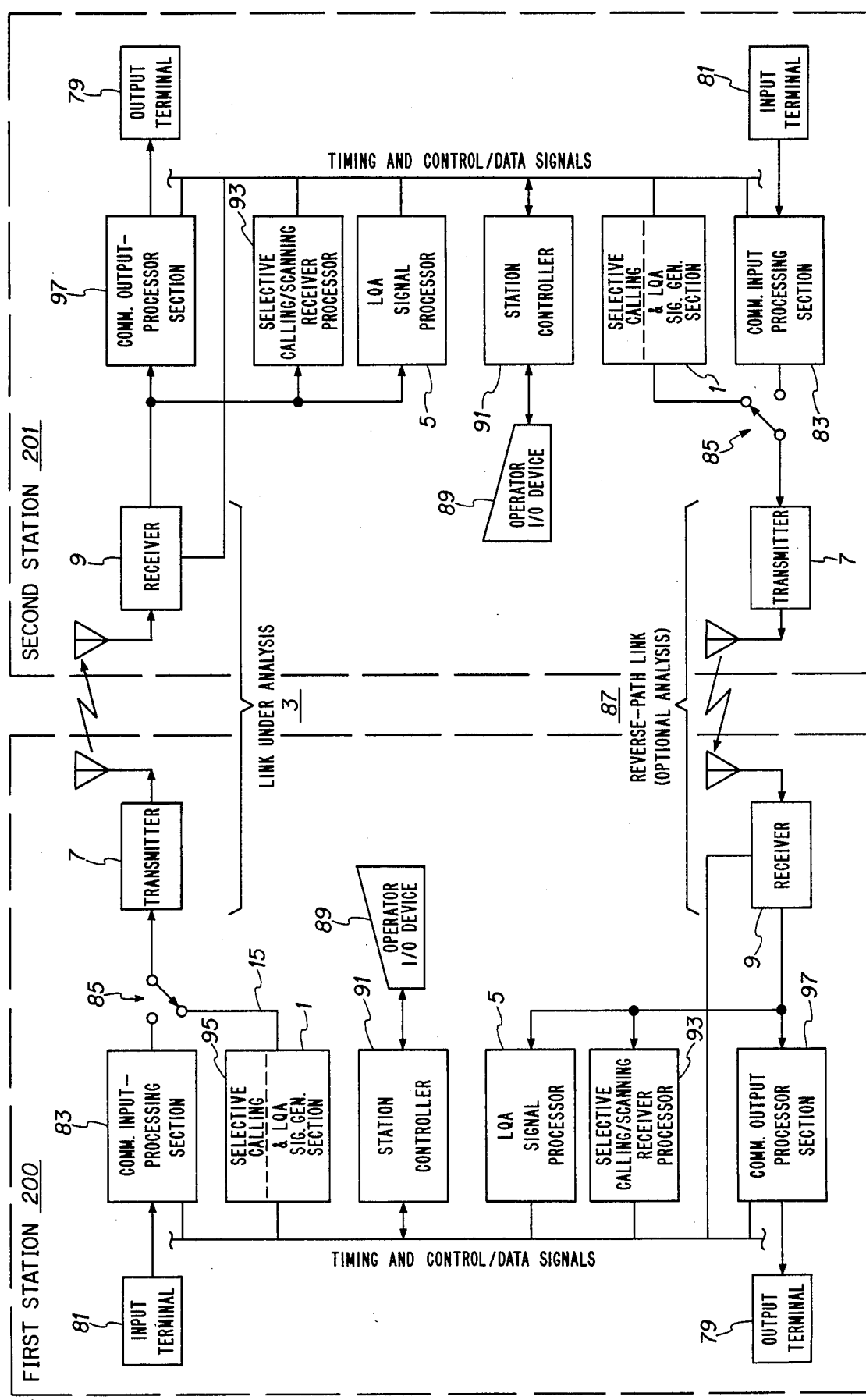
FIG. 11 is a representation of a communication system incorporating the link quality analyzer according to the invention.

FIG. 11 illustrates an application of a link quality analyzer to a communication system in which there is a first station 200 which communicates with a second station 201. The stations are essentially identical and each has included therein a station controller 91 which in the preferred embodiment is a minicomputer such as a PDP 11 manufactured by Digital Equipment Corporation and the associated interfaces. The station controller 91 is controlled by an I/O device 89 to which the operator inputs data. Associated with each station is a selective calling generator 95 and a selective-calling and scanning receiver processor 93. These units were discussed in U.S. Pat. No. 4,328,581 and can be used to implement the selective-calling function. An input terminal 81 under normal operation provides either digital data or voice signals to a communication input processing section 83, which in the event of digital data is a modem or for voice input is a voice processor, for transmitting by the transmitter 7. In the communications transmit mode switch 85 connects the communication input processing section to the transmitter 7 for transmission of information. In link testing mode, switch 85 is connected to the LQA signal generator 1 which provides for either the transmission of the selective-calling signals provided from the selective calling section 95 or the LQA signal generator section 1 over the link under analysis 3 and 87. The information is received by a receiver 9 and applied to either a communication output processor section 97, which in the event of digital data is a demodulator or a speech processor, the output of which is applied to either a terminal or a speaker, depending on the application of the device 79. In the selective-calling mode, the selective-calling receiver processor 93 establishes the link. In the test mode, of course, the LQA signal processor 5 processes the received signals and noise. The program that is contained in the station controller 91 is illustrated in the flow chart of FIGS. 12a through 12d.

The operation of the adaptive communication system of FIG. 11 is illustrated more fully in FIGS. 12a through 12d which are flow charts of the operation of the adaptive communication system and should be referred to at this time. In FIG. 11, to which reference should now be made, the first station 200 will be designated as the calling station and the second station 201 will be designated the called station. Both stations are initiated and at the start position 250 and 251 in FIG. 12a. The calling station 200 will transmit the called station address at block 252 and then proceed to block 253 where it transmits the calling station's address and the traffic type requirements. At block 254 it listens to receive the called station address reply and then at block 255 it listens to receive the selective-calling link quality factor. At decision block 256 it makes a decision if there is a requirement for high quality link and if the quality of the present frequency is unacceptable then it loops back to block 257 where it selects a new frequency. If the answer is no, (If there is no requirement for high quality link) it goes to block 264 where it initiates conventional communication links, at the completion of which the calling station will exit at block 265. During this process the called station 201 will scan its assigned channels at block 258. It will listen at each channel for its own address at decision block 259. If it does not receive its own address, it goes back to scanning the assigned channels at block 258. If it does receive its own address then the called station 201 will proceed to receive the calling station address and link requirements at block 260. In the next block 261, the called station 201 will transmit its address reply and at block 262 it will transmit the selective-calling link quality factor. At block 263 it will determine if a request for a high quality link exists. If the answer is yes and the link frequency is unacceptable it will go back to the scanning mode at block 258. If there is no request for a high quality link then it will go to block 264 where the communication is established and then exit at block 265.

Figure 12A:
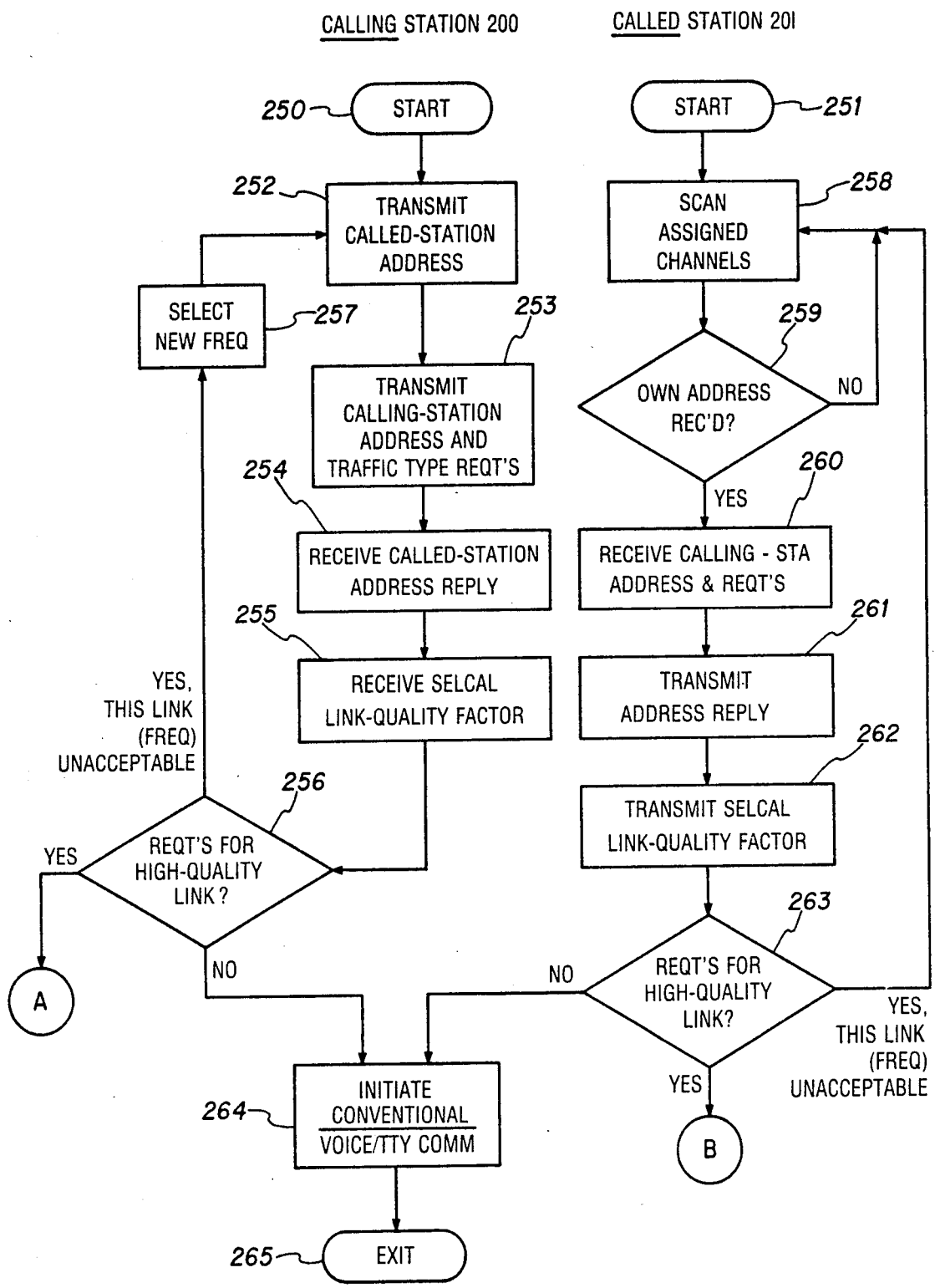
FIGS. 12a through 12d are flow diagrams of the operation of the adaptive communication system of FIG. 11.
Figure 12B:
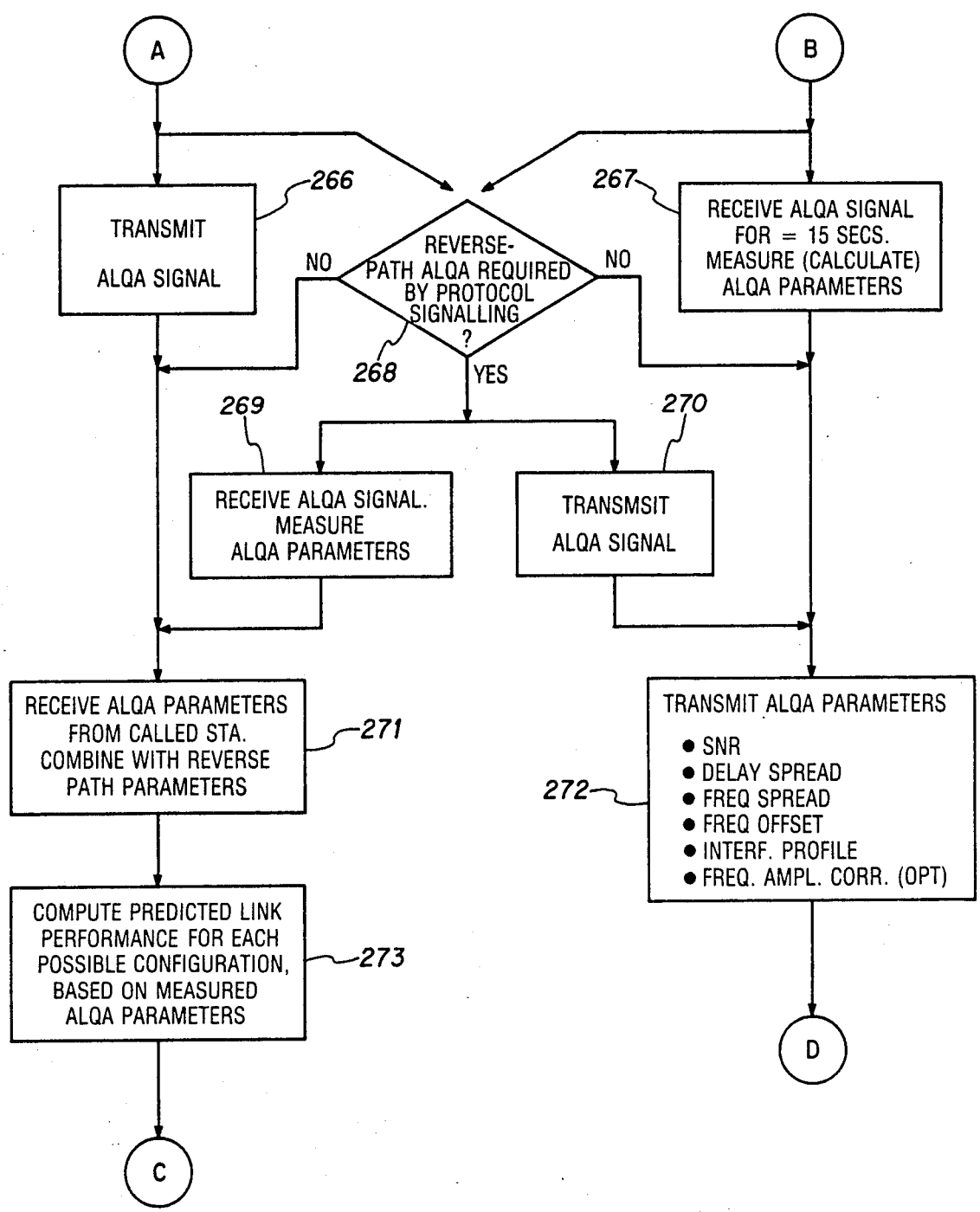

If there is a request for a high quality link and if the frequency is acceptable then the calling station 200 will advance to block 266 of FIG. 12b via tie point A and the called station will advance to block 267 of FIG. 12b via tie point B.

The calling station 200 at block 266 will transmit the LQA signal which is the four tones that are generated by the LQA generator 1 of FIG. 11. Additionally, if there is a requirement for an LQA reverse path by protocol then at decision block 268 that determination is made and if the answer is yes, the called station 201 will transmit the LQA signal at block 270 and the calling station 200 will receive the LQA signal and measure its parameters at block 269 as described below. If however this is not a requirement, then the calling station 200 will proceed to receive the LQA parameters measured in block 267 and transmitted (at block 272) from the called station and combine them, if required, with the reverse path parameters at block 271. At block 273 the LQA processor 5 of the calling station 200 will predict the link performance for each possible communication input process section 83 configuration and output processing section 97 configuration based on the measured LQA parameters. Simultaneously with this, the called station 201 at block 267 waits for a selected period of time, which is in the preferred embodiments 15 seconds, to receive the LQA signals and it will measure and calculate its LQA parameters. At block 272 it will transmit the LQA parameters, including the signal-to-noise ratio, the delay spread, the frequency spread, the frequency offset, and the interference profile, and the other parameters relevant to the link quality.

Figure 12C:
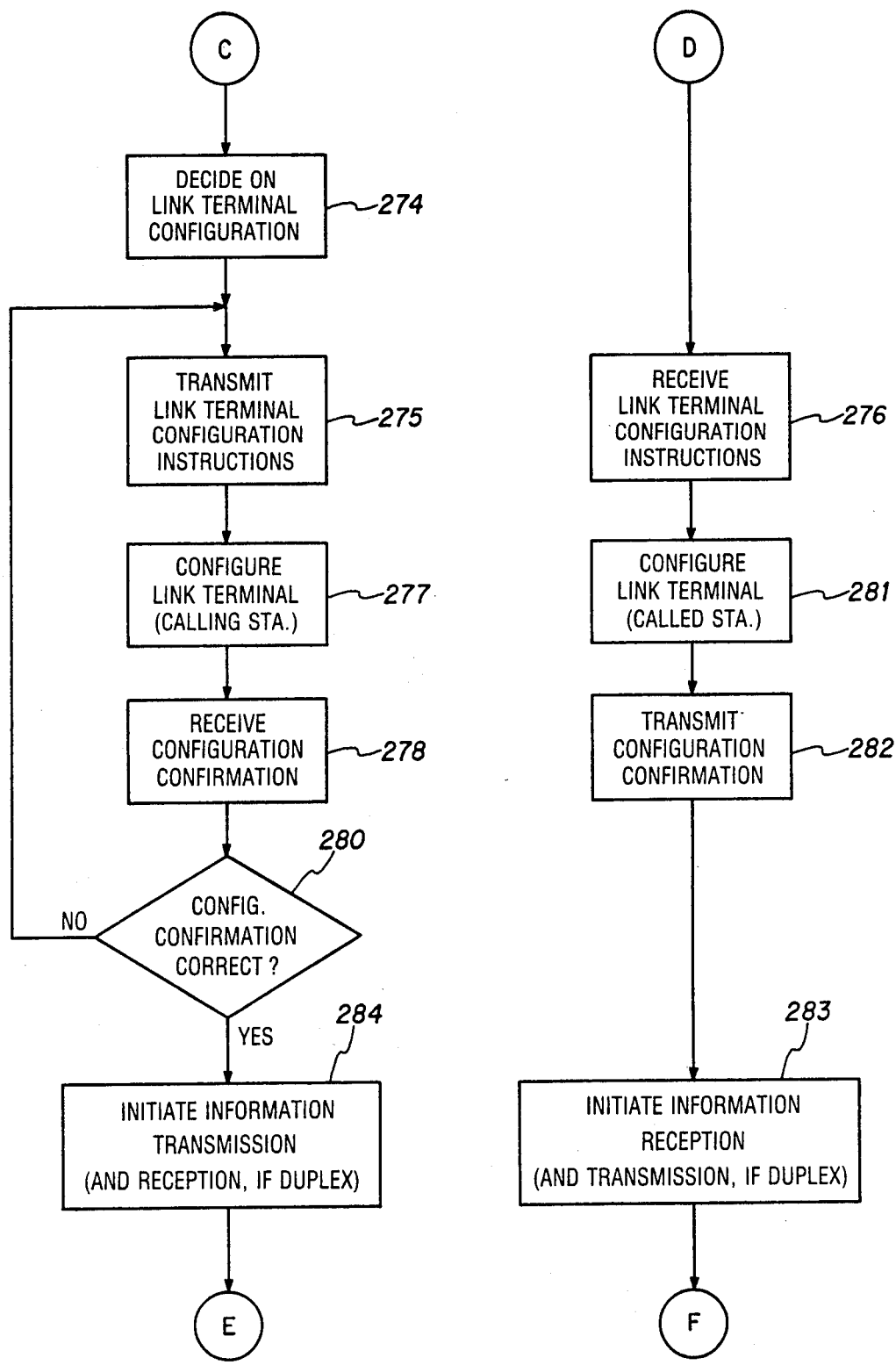

After tie point C, at block 274 of FIG. 12c, the calling station 200 will decide on the optimum link terminal configuration based on the measured parameters and enter into a loop 279 at block 275 which includes the steps of transmitting the link terminal configuration instructions, configure the calling station 200 link terminal at block 277 and receive configuration confirmation at block 278. At decision block 280 the calling station 200 makes a decision if the configuration is correct, if not it will loop back by the loop 279 to the beginning of block 275 where the calling station 200 will again transmit the link terminal configuration instructions. Simultaneously with the performance of the loop 279 the called station 201 is listening and will receive the link terminal configuration instructions at block 276, configure the link terminal at block 281 and transmit confirmation of the configuration at block 282. At block 283 the called station 201 will initiate information reception and transmission if duplex. Simultaneously, the calling station 200 at block 284 will also initiate information transmission and reception if the system is duplex.

Figure 12D:
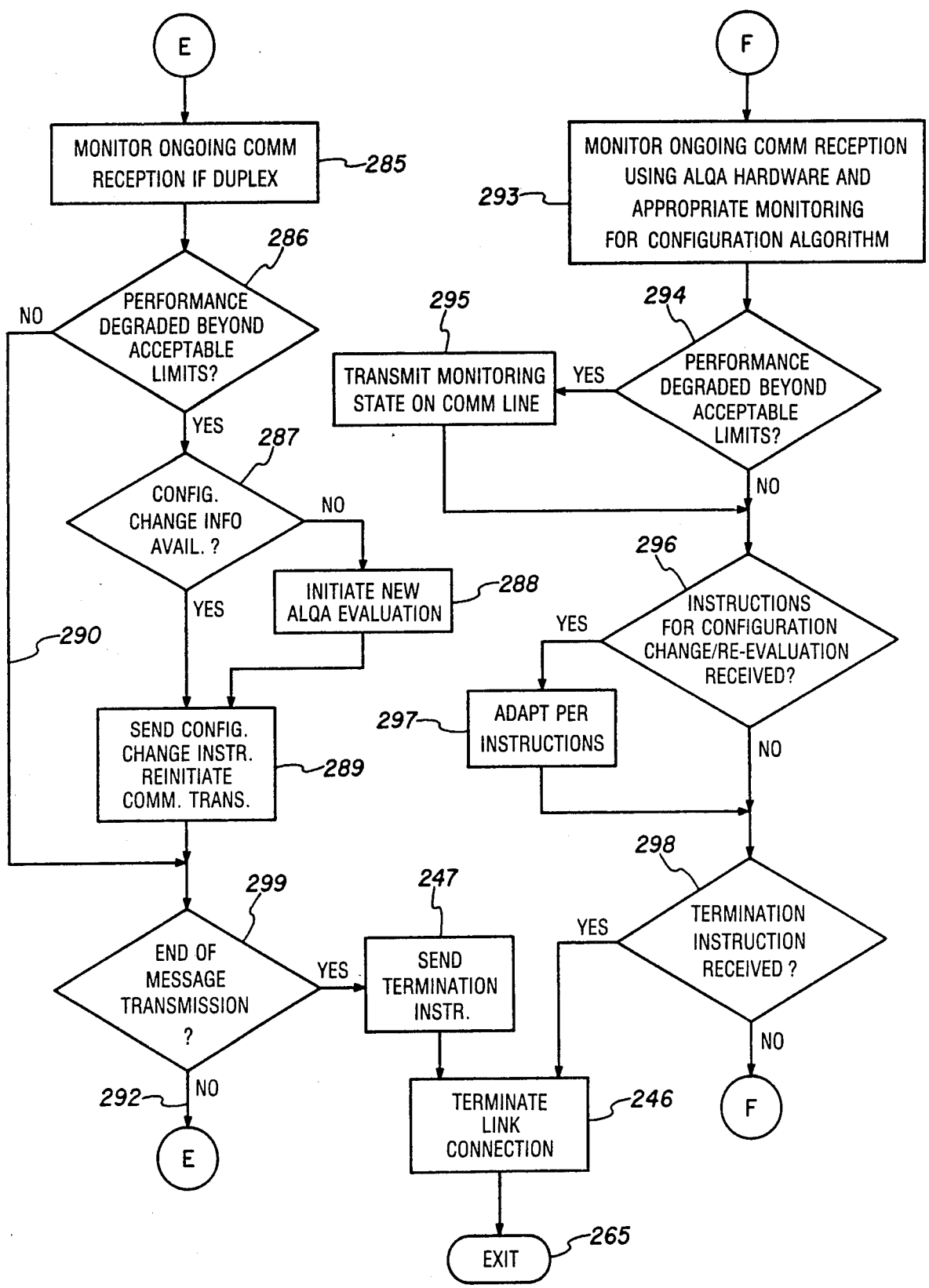

FIG. 12c is tied to FIG. 12d via tie points E and F, in which the final stage of the communication process is performed at block 285 and includes a dual loop system that includes loops 290 and loop 292. The calling station 200 will monitor ongoing communications at block 285 and at block 286 it will listen to ensure that the performance does not degrade beyond acceptable limits. This operation is performed primarily by the error code checking to insure that the error rate does not exceed pre-established limits. If it does exceed preestablished limits, then at block 287 the configuration is changed if information is available. If the information is not available then at block 288 a new LQA evaluation as per block 266 through 274 is performed. At block 289 the new configuration is established. If there is no degradation then the system through loop 290 proceeds to end of message transmission at decision block 299. If the end of message is not transmitted, then the loop 292 and tie points E will return back up to the beginning of block 285. If the end of message is received, then at block 247 the termination initiation instruction is transmitted and at block 246 the link is terminated and the ystem exits at 265.

Simultaneously with the performance of these functions, the called station 201 is likewise monitoring ongoing reception at block 293. At decision block 294, a decision is made whether or not the performance of the system is degraded beyond acceptable limits. If it is, then at block 295 the called station 201 transmits the monitoring state on the communication link. If the performance has not degraded beyond acceptable limits or if the called station 201 has transmitted the monitoring state on the communication link then at decision block 296 it waits for received instructions for configuration change or re-evaluation. If instruction for configuration change or re-evaluation is received, then at block 297 the called station adapts per the received instructions. If the instructions are not received or after the adaption of instructions, at block 298 the called station 201 listens for receipt of termination instructions. If the terminations are not received then it loops back up to the beginning of block 293 via tie point F where it monitors ongoing communications/instructions. If the termination is received then at block 246 the link connection is terminated and the called station 201 exits at block 265.

Many changes and modifications in the above described invention can, of course, be carried out without departing from the scope thereof. Accordingly, the invention is intended to be limited only by the scope of the appended claims.

What is claimed:

1. A line quality analyzer for measuring the quality of communication links in a communications system comprising:
   means for transmitting information over a selected communication link;
   means for generating a plurality of signal tones and coupling those tones for transmission by said means for transmitting over said communication link;
   means for receiving said plurality of transmitted tones and any noise on said communication link to obtain a received signal;
   means for time domain sampling said received signal to obtain a set of N blocks of digitized samples with each block having M samples, where M and N are integers;
   Fast Fourier Transform means for transforming the blocks of M digitized samples from the time domain to the frequency domain; and
   measuring means for detecting the frequency spreads for each of the plurality of transmitted tones and for detecting the multipath time delay spreads represented by received envelopes of at least each tone pair contained within the plurality of transmitted tones to obtain link quality parameters representing the quality of said communication link.

2. The analyzer of claim 1 wherein said means for detecting multipath time delay spread includes means for detecting multipath time delay spreads represented by the received envelopes of each tone pair contained within the plurality of transmitted tones and means for detecting multipath time delay spreads as represented by the received envelopes of each tone triplet contained within the plurality of transmitted tones.

3. The link quality analyzer according to claim 1 wherein the measuring means further comprises:
   indexing means for indexing the transformed signal components according to frequency to obtain a power spectrum of the plurality of signal tones and link noise in sets of sample time;
   frequency offset measuring means for measuring the freqeuncy offset of each member of the plurality of tones from the power spectrum;
   accumulator means for accumulating the power spectrum of subsequent reception of the plurality of tones and link noise to obtain an accumulated spectrum;
   storage means for storing each power spectrum of each set of plurality of tones and link noise as well as the frequency offset; and
   post acquisition measuring means for measuring the link quality parameters from the accumulated spectra, each tone power spectrum and the frequency offset.

4. The link quality analyzer according to claim 3 wherein the post acquisition measuring means comprises:
   separator means for separating from the accumulated power spectra, the accumulated noise power in preselected subbands excluding subbands containing said tones to obtain a subband noise indication for each block of M samples, where a subband is a portion of the frequency spectrum; and
   formulation means for formulating average total noise power of all the selected subbands in each block to obtain a BLKNOISE for each block of M samples.

5. The link quality analyzer according to claim 3 wherein the post-acquisition measuring means further comprises:
   noise amplitude measuring means for measuring the amplitude values for N blocks of M samples from noise power values for the N blocks of M samples;
   summation means for summing the noise amplitude values over N blocks of M samples to obtain a noise summation thereby.

6. The link quality analyzer according to claim 3 wherein the post acquisition measuring means comprises:
   accumulator means for accumulating noise subband powers, where a subband is a portion of the frequency spectrum;
   first averaging means for averaging the noise amplitude;
   second averaging means for averaging noise power;
   third averaging means for averaging the noise subband powers to obtain a subband noise indication;
   square root means for taking the square root of the average noise power to attain a first signal;
   divider means for dividing the average noise amplitude into the first signal to obtain the RMS/means noise ratio; and
   profile means for obtaining a noise profile for a set of N blocks of M data samples from the subband noise indication and the average noise power.

7. The link quality analyzer according to claim 3 wherein the post acquisition measuring means comprises:
   separator means for separating tone power values for each of the N blocks of M samples to obtain a tone amplitude, TONEDATA, indications;
   first averaging means for averaging the TONEDATA indication for N blocks of M samples; and
   normalizing means for normalizing the tone amplitude average of the TONEDATA indication.

8. The link quality analyzer according to claim 3 wherein the post acquisition measuring means comprises:
   normalizing means for normalizing tone amplitude values for each of the N blocks of M samples of data;
   summation means for summing the normalized tone amplitude values to obtain a summed signal;
   square root means for obtaining the square root of the summed signal; and
   divider means for dividing 7.07 into the square root of the summed signals to obtain the equivalent amplitude modulation index due to fading of each tone of the plurality of transmitted tones.

9. The link quality analyzer according to claim 3 wherein the post acquisition measurement means further comprises:
fade detector means for detecting when the amplitude of each tone drops below a pre-established threshold fading depth detector means for detecting the average depth of a fade in amplitude of each tone, fading rate detector means for detecting the average rate of fading below the pre-established threshold in amplitude of each tone; and
average burst peak detector means for detecting the average peak of a burst of noise exceeding a pre-established threshold and average burst time length measuring means for measuring the average length in time between bursts of noise; and
average burst rate measurement means for measuring the average number of noise bursts that occur per second, and average interburst time length measurement means for measuring the average time between noise burst occurrance.

10. A link quality analyzer for measuring the quality of communication links between a transmitting station and a receiving station comprising:
line quality analyzer signal generator means for transmitting a plurality of signal tones over a communication link;
receiver means for receiving the plurality of transmitted tones and link noise to obtain a received signal;
sampling means for time domain sampling the received signal to obtain a set of N blocks of digitized samples with each block having M samples;
Fast Fourier Transform means for transforming the blocks of M digitized samples from the time domain to the frequency domain; and
means for measuring the transformed signals to obtain link quality parameters for the N blocks of M samples where M and N are positive integers, said means for measuring comprising:
indexing means for indexing the transformed signals according to frequency to obtain a power spectrum of the plurality of signal tones and link noise in sets of sample time,
frequency offset measuring means for measuring the frequency offset of each of the plurality of tones from the power spectrum,
accumulator means for accumulating the power spectrum of subsequent reception of the plurality of tones and link noise to obtain an accumulated spectrum,
storage means for storing each power spectrum of each set of plurality of tones and link noise as well as the frequency offset, and
post acquisition measuring means for measuring link quality parameters representing the quality of said communication link from the accumulated spectra, each tone power spectrum, and the frequency offset, said post acquisition measuring means further including:
average frequency offset measuring means for obtaining an average frequency offset for each tone,
RMS frequency offset value detector means for detecting an RMS frequency offset value for each tone,
correlator means for obtaining amplitude correlation coefficients for each of the plurality of transmitted tones from the N blocks of M samples,
frequency spread detector means for detecting frequency spreads for each of the plurality of transmitted tones from the N blocks of M samples,
envelope detector means for detecting received envelopes for each tone of the plurality of transmitted tones,
multipath time delay spread detector means for detecting multipath delay spreads as indicated by the received envelopes of each tone pair contained within the plurality of transmitted tones,
multipath time delay spread detector means for detecting multipath time delay spread as indicated by the received envelopes of each of the tone triplets contained within the plurality of transmitted tones,
harmonic measuring means for detecting the second and third harmonics for each of the plurality of transmitted tones, and
intermodulation distortion measuring means for measuring intermodulation products due to pairs of the plurality of transmitted tones.

11. A method for measuring the quality of communication links in a communications system comprising:
transmitting information over a selected communication link;
generating a plurality of signal tones and coupling those tones for transmission over said communication link;
receiving said plurality of transmitted tones and any noise on said communication link to obtain a received signal;
time domain sampling said received signal to obtain a set of N blocks of digitized samples with each block having M samples, where M and N are integers;
transforming the blocks of M digitized samples from the time domain to the frequency domain by Fast Fourier Transform; and
detecting the frequency spreads for each of the plurality of transmitted tones and detecting the multipath time delay spreads represented by received envelopes of at least each tone pair contained within the plurality of transmitted tones to obtain link quality parameters representing the quality of said communication link.

12. The method of claim 11 wherein the step of detecting multipath time delay spreads include the steps of detecting multipath time delay spreads represented by the received envelopes of each tone pair contained within the plurality of transmitted tones and detecting multipath time delay spreads as represented by the received envelopes of each of tone triplets contained within the plurality of transmitted tones.

13. The method according to claim 11 wherein the step measuring the transform signals further comprises:
indexing the transformed signal components according to frequency to obtain a power spectrum of the plurality of signal tones and link noise in sets of sample time;
measuring the frequency offset of each member of the plurality of tones from the power spectrum;
accumulating the power spectrum of subsequent reception of the plurality of tones and link noise to obtain an accumulated spectrum;

storing each power spectrum of each set of plurality of tones and link noise as well as the frequency offset; and measuring the link quality parameters from the accumulated spectra, each tone power spectrum and the frequency offset.

14. The method according to claim 13 wherein the step of measuring the link quality parameters comprises:

separating from the accumulated power spectra, the accumulated noise power in preselected subbands excluding subbands containing said tones to obtain a subband noise indication for each block of M samples, where a subband is a portion of the frequency spectrum; and formulating average total noise power of all the selected subbands in each block to obtain a BLKNOISE for each block of M samples.

15. The method according to claim 13 further comprising the steps of:

measuring the amplitude values for N blocks of M samples from noise power values for the N blocks of M samples;

summing the noise amplitude values over N blocks of M samples to obtain a noise summation thereby.

16. The method according to claim 13 further comprising the steps of:

accumulating noise subband powers, where a subband is a portion of the frequency spectrum;

averaging the noise amplitude;

averaging noise power;

averaging the noise subband powers to obtain a subnoise indication;

taking the square root of the average noise power to obtain a first signal;

dividing the average noise amplitude into the first signal to obtain the RMS/means noise ratio; and obtaining a noise profile for a set of N blocks of M data samples from the subband noise indication and the average noise power.

17. The method according to claim 13 further comprises the steps of:

separating tone power values for each of the N blocks of M samples to obtain a tone amplitude, TONEDATA, indication;

averaging the TONEDATA indication for N blocks of M samples; and normalizing the tone amplitude by the tone amplitude average of the TONEDATA indication.

18. The method according to claim 13 further comprising the steps of:

normalizing tone amplitude values for each of the N blocks of M samples of data;

summing the normalized tone amplitude values to obtain a summed signal;

obtaining the square root of the summed signal; and dividing 7.07 into the square root of the summed signals to obtain the equivalent amplitude modulation index due to facing of each of the plurality of transmitted tones.

19. The method according to claim 13 further comprises:

detecting when the amplitude of each tone drops below a pre-established threshold, detecting the average depth of a fade in amplitude of each tone, and detecting the average rate of fade below the pre-established threshold in amplitude of each tone; and detecting the average peak of a burst of noise exceeding the pre-established threshold, measuring the average length in time between bursts of noise, measuring the average number of noise bursts that occur per second, and measuring the average time between noise burst occurrence.

20. A method of measuring the quality of communication links between a transmitting station and a receiving station comprising:

transmitting a plurality of signal tones over a communication link;

receiving the plurality of transmitted tones and link noise to obtain a received signal;

time domain sampling said received signal to obtain a set of N blocks of digitized samples with each block having M samples;

transforming the blocks of M digitized samples from the time domain to the frequency domain; and measuring the transformer signals to obtain link quality parameters representing the quality of said communication link for N blocks of M samples where M and N are positive integers, said measuring step including:

indexing the transformed signals according to frequency to obtain a power spectrum of the plurality of signal tones and link noise in sets of sample time, measuring the frequency offset of each of the plurality of tones from the power spectrum, accumulating the power spectrum of subsequent reception of the plurality of tones and link noise to obtain an accumulated spectrum, storing each power spectrum of each set of plurality of tones and link noise as well as the frequency offset, and measuring link quality parameters from the accumulated spectra, each tone power spectrum and the frequency offset, said step of measuring the link quality parameters further including:

obtaining an average frequency offset for each tone, obtaining an RMS frequency offset value for each tone, obtaining amplitude correlation coefficients for each of the plurality of transmitted tones from the M blocks of N samples, detecting frequency spreads for each of the plurality of transmitted tones from the N blocks of M samples, detecting received envelopes of each tone of the plurality of transmitted tones, detecting multipath time delay spreads as indicated by the received envelopes of each tone pair contained within the plurality of transmitted tones, detecting multipath time delay spread as indicated by the received envelopes of each of the tone triplets contained within the plurality of transmitted tones, detecting the second and third harmonics for each of the plurality of transmitted tones, and measuring intermodulation products due to pairs of members of the plurality of transmitted tones.

21. A communications system for measuring the quality of communication links and selecting a communication channel based on measured quality comprising:

means for transmitting information over a selected communication link;

means for generating a plurality of signal tones and coupling those tones for transmission by said means for transmitting over said selected communication link;

means for receiving said plurality of transmitted tones and any noise on said selected communication link to obtain a received signal;

means for time domain sampling said received signal to obtain a set of N blocks of digitized samples with each block having M samples, where M and N are integers;

Fast Fourier Transform means for transforming the N blocks of M digitized samples from the time domain to the frequency domain;

means responsive to the N blocks of M samples for detecting the frequency spreads for each of the plurality of transmitted tones and for detecting multipath time delay spreads represented by received envelopes of at least tone pairs contained within the plurality of transmitted tones to obtain link quality parameters representing the quality of said communication link;

means for selectively changing the communication link over which said signal tones are transmitted to determine the link quality parameters of multiple communication links; and means responsive to a predetermined link quality represented by said parameters detected on each of said selected communication links for selecting a communication link having said predetermined link quality as a communication channel.

* * * * *